(12) United States Patent
Ishigami et al.

(10) Patent No.: US 6,452,634 B1
(45) Date of Patent: Sep. 17, 2002

(54) CHARGE TRANSFER DEVICE AND METHOD OF DRIVING THE SAME, AND SOLID STATE IMAGING DEVICE AND METHOD OF DRIVING THE SAME

(75) Inventors: Tomio Ishigami; Shinji Nakagawa, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/996,313

(22) Filed: Dec. 22, 1997

(30) Foreign Application Priority Data

Dec. 26, 1996 (JP) .............................. 8-348806
Mar. 24, 1997 (JP) .............................. 9-069470

(51) Int. Cl.[7] .............................. H04N 3/14; H01L 27/01
(52) U.S. Cl. ...................... 348/322; 348/311; 257/346
(58) Field of Search .................... 348/311, 312, 348/322, 324, 314, 315, 317, 320, 321, 323; 257/242, 246, 247, 248

(56) References Cited

U.S. PATENT DOCUMENTS 4,347,656 A * 9/1982 Smith et al. ................ 257/248
5,239,380 A * 8/1993 Yokoyama .................. 348/322

* cited by examiner

Primary Examiner—Wendy R. Garber
Assistant Examiner—Rashawn M. Tilley
(74) Attorney, Agent, or Firm—Sonnenschein, Nath & Rosenthal

(57) ABSTRACT

A charge transfer device having a charge transfer portion in which a plurality of electrode pairs are formed above a transfer channel, with the plurality of electrode pairs commonly wired forming N (where N=2, 3, 4, . . . natural numbers) bits of the charge transfer portion bits so that electrode pairs of each half bit can be independently driven at every N bits, inputting the electrode pairs of each half bit with the same drive pulse to operate it by a two-phase complementary drive in a normal operation, and in an N-time speed operation, inputting the electrode pairs of N bits with N pairs of complementary drive pulses to operate them by a 2N-phase complementary drive.

15 Claims, 22 Drawing Sheets

Prior Art

Prior Art

F I G. 7
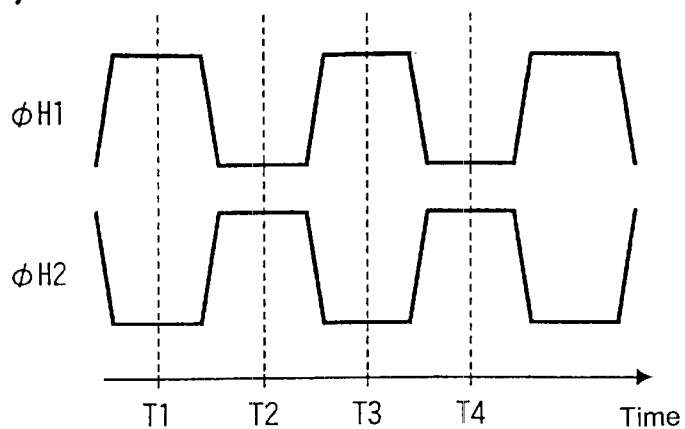
Prior Art

F I G. 12A
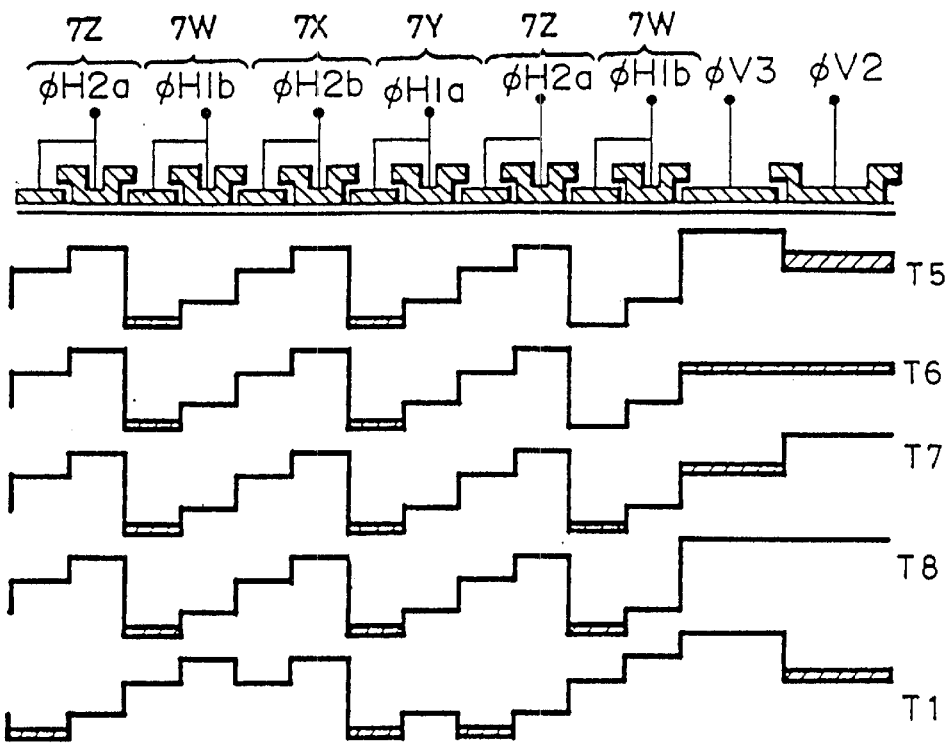
F I G. 12B
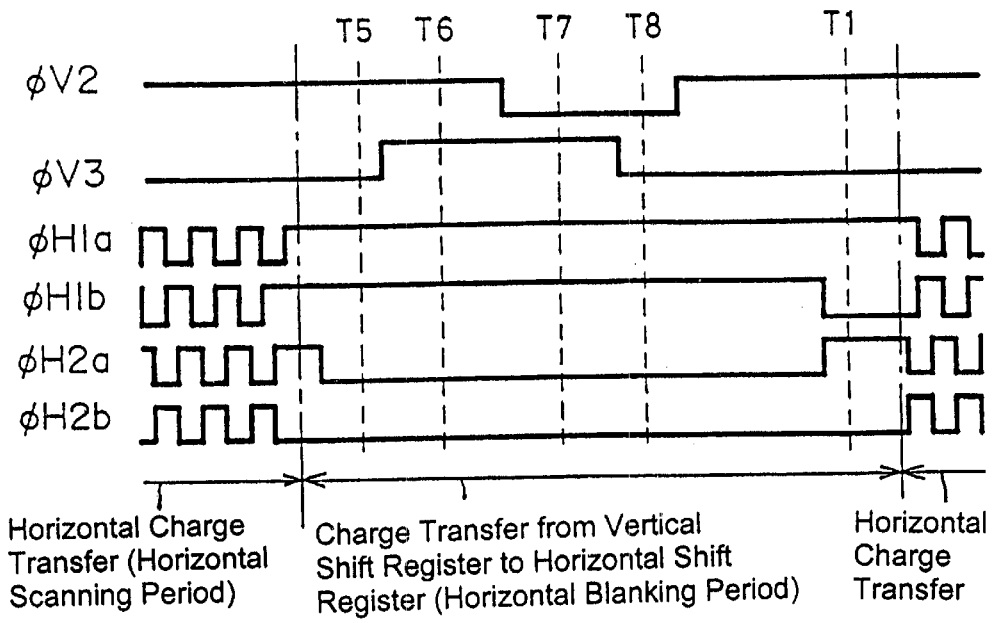

F I G. 13
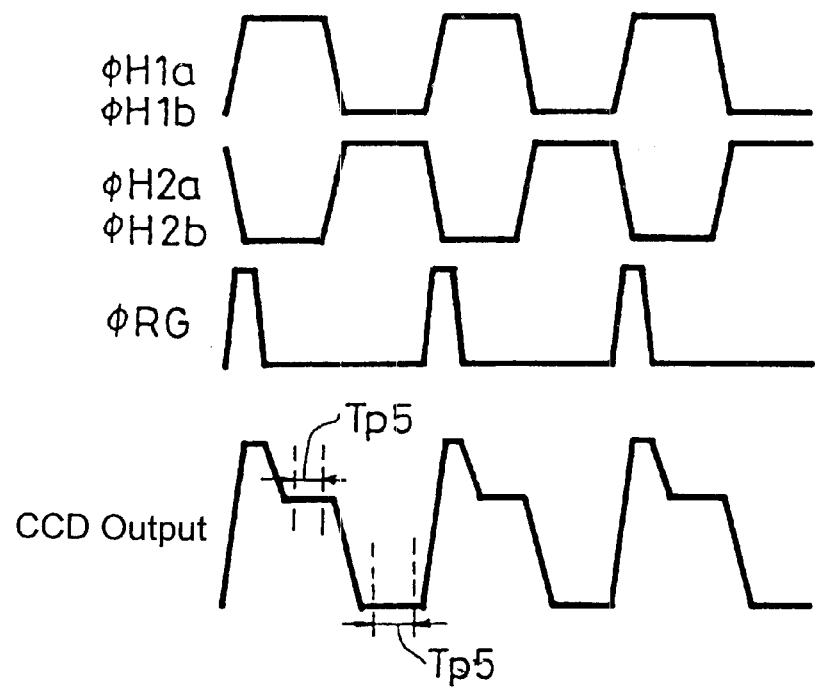

CHARGE TRANSFER DEVICE AND METHOD OF DRIVING THE SAME, AND SOLID STATE IMAGING DEVICE AND METHOD OF DRIVING THE SAME

BACKGROUND OF THE INVENTION

1. Field of the Invention

The present invention relates to a charge transfer device and a method of driving the same, and a solid-state imaging device and a method of driving the same.

2. Description of the Related Art

In recent years, higher quality cameras have been demanded in the field of an animation picture camera and a still picture camera.

Although, generally the number of picture elements of an imaging device is increased to raise the quality of such a picture, an increase of the number of picture elements delays a transfer rate upon frame transfer of a signal charge of the picture element or a so-called frame rate. Consequently, in an auto focus (AF: auto focus control) camera using output signals of an imaging device, an auto iris (AE, auto exposure control) camera, auto white balance (AWB) camera and the like, the feedback is delayed or it may be difficult to follow a motion of a camera or a movement of an object when a composition is determined while seeing an animation output in an electronic still camera.

FIG. 1 is a plan view of an example of a CCD imaging device 51 to be used in such a camera. This CCD imaging device 51 transfers a signal charge in a so-called inter-line transfer method. In this imaging device, a plurality of light receiving units 52 made of a photo sensor are arranged in a matrix configuration. Each column of the light receiving units 52 is connected to a vertical CCD register 54 through a reading gate portion 53, and the vertical CCD registers 54 are connected to a horizontal CCD register 55. Charges from the horizontal CCD register 55 are converted through an output circuit such as an amplifier 56 or the like a voltage and then outputted as an output voltage $V_{out}$.

In the vertical ccD register 54, vertical drive pulses $\phi V1$, $\phi V2$, $\phi V3$, $\phi V4$ are applied to its transfer electrode and the signal charges are transferred in the 4-phase driving.

On the other hand, in the horizontal CCD register 55, horizontal drive pulses $\phi H1$, $\phi H2$ are applied alternately to the transfer electrodes arranged corresponding to each column of the respective light receiving unit and the signal charges are transferred in the 2-phase driving as described later.

To solve the above problem, that is, to raise the frame rate, it can be considered to increase the driving frequency of the CCD register of the CCD imaging device or the system. However, if the driving frequency is increased, its power consumption will resultantly increase.

In the CCD imaging device, a correlated double sampling (CDS) is carried out so as to cancel a reset noise or the like. If the driving frequency is raised, a necessity of carrying out the phase adjustment of sampling hold pulse in this sampling arises so that production efficiency drops.

As a means for making a horizontal scanning period half without increasing the data rate from the CCD imaging device, there are a method of adding two horizontal picture elements by floating diffusion (FD) by doubling the drive frequency of the horizontal CCD register and a method of adding two picture elements at the final stage by doubling the drive frequency of a stage other than the final stage of the horizontal CCD register. However, in any cases, the shape of output waveform is changed, so that the preset period or data period of the output waveform which can be sampled by the correlated double sampling or the like is reduced.

FIG. 2 shows a configuration of a 2-phase drive horizontal CCD register of the CCD imaging device 51 shown in FIG. 1 and its potential in the transfer direction. FIG. 3 shows the drive pulses $\phi H1$, $\phi H2$ and the CCD output waveform upon a normal operation of the horizontal CCD register.

In the horizontal CCD register 55, as shown in FIG. 2, a plurality of transfer electrodes 57 comprising a storage electrode 57s made of multi-crystal silicone of a first layer, and a transfer electrode 57t made of multi-crystal silicone of a second layer are arranged on a semiconductor substrate through an insulation film in the electrode transfer direction so as to form a plurality of transfer portions. A first phase drive pulse $\phi H1$ is applied to the transfer electrode 57 of every second transfer portion, and a second phase drive pulse $\phi H2$ is applied to the transfer electrode 57 of every other transfer portion, so that the signal charge is transferred by a so-called 2-phase complementary drive.

That is, as shown in FIG. 2, at a time point T1, the first phase drive pulse $\phi H1$ becomes a high level while the second phase drive pulse $\phi H2$ becomes a low level, so that the potential of the transfer portion to which $\phi H1$ is to be applied becomes deep and then a signal charge e is transferred thereto.

Next, at a time point T2, the first phase drive pulse $\phi H1$ becomes a low level while the second phase drive pulse $\phi H2$ becomes a high level, so that the potential of the transfer electrode portion to which $\phi H2$ is to be applied becomes deep and hence the signal charge is transferred from the transfer portion to which $\phi H1$ is to be applied to the transfer portion to which $\phi H2$ is to be applied.

In this manner, the signal charges are successively transferred in the transfer direction by the 2-phase drive pulses $\phi H1$, $\phi H2$.

The transfer portion at the final stage of the horizontal CCD register 55 is so constructed that the first phase drive pulse $\phi H1$ is applied thereto. At the time point T2, the signal charge is transferred from the horizontal CCD register 55 to the floating diffusion (FD) (not shown) and converted to a signal voltage.

After a signal is read through the floating diffusion (FD), a reset gate pulse $\phi RG$ is applied to a reset gate portion adjacent to the floating diffusion (FD) so that the charge of the floating diffusion (FD) is reset.

Thus, a CCD output waveform shown in FIG. 3 is obtained.

A portion Tp in the CCD output waveform is a section which indicates a preset signal and a portion therein Td is a section which indicates a data signal.

As for the output signal from the CCD imaging device, generally so as to improve an S/N ratio, first the correlated double sampling, that is, the preset signal Tp is clamped and then the data signal portion Td is sampled.

Meantime, if the number of picture elements is increased to improve the picture quality, a fetch speed of one picture screen, that is, a so-called frame rate is retarded, so that feedback of AF, AE, AWB or the like using the CCD output signal is delayed or it becomes difficult to display the same on a liquid crystal screen or the like to confirm its composition.

To improve such a defect, there is a method of doubling the drive frequency of, for example, the horizontal CCD register so as to quicken the output data rate.

FIG. 4 shows a horizontal drive pulse and a CCD output waveform of this case.

Because the drive frequency is doubled, the wavelengths of the horizontal drive pulse φH1, φH2 and the reset gate pulse φRG become half respectively and the period of the CCD output waveform also becomes half.

However, in this case, widths Tp2, Td2 of the portions for carrying out the clamp or sampling become half as compared to a usual case, so that the phase of a clamp pulse or sampling pulse needs to be adjusted one by one thereby reducing production efficiency.

Further, because the data rate doubles, the signal processing speed also doubles so that power consumption and noise increase. Further, because the system design is limited, disadvantage arises in production cost.

On the other hand, as a method of doubling the scanning speed of the horizontal CCD register without changing the data rate, there is a method of adding signal charge of two horizontal picture elements at the floating diffusion (FD).

FIG. 5 shows a horizontal drive pulse and a CCD output waveform of this case.

According to this method, the lengths of a preset period Tp3 and a data period Td3 become half as compared to the usual case like Tp2 and Td2, respectively. Therefore, the phases of the clamp pulse and sampling pulse must be adjusted.

This is because Tp3 is limited by the high level period of a first time of the horizontal drive pulse φH1 and Td3 is limited by the low level period of a second time of the horizontal drive pulse φH1.

FIG. 6 is a sectional view showing the horizontal transfer register of a solid-state imaging device, for example, a CCD area sensor. Referring to FIG. 6, an N type transfer channel 103 is formed on the surface side of an N type substrate 101 with a P type well 102 disposed therebetween. On the N type transfer channel 103 are arranged gate electrodes 104, 105 of first and second layers, which are formed of polysilicone or the like through a gate insulating film (not shown), alternately in the portion direction.

In the surface portion of the transfer channel 103 below the gate electrode 105 is ion-implanted an N- impurity. The gate electrodes 104, 105 ,of the first and second layers adjacent to each other serve as a pair and horizontal transfer clocks φH1, φH2 having opposite phase to each other as shown in FIG. 7 are applied to each pair of the gate electrodes 104, 105 alternately. The horizontal transfer clocks φH1, φH2 carry out complementary drive for the horizontal transfer register.

A transfer operation on the horizontal transfer register having the aforementioned structure will be described with reference to a potential diagram shown in FIG. 8. FIG. 8 shows potential distribution at each of timings T1–T4 of FIG. 7.

Because the horizontal transfer clock φH1 of the first phase is of high level (hereinafter referred to as "H" level) while the horizontal transfer clock φH2 of the second phase is of low-level (hereinafter referred to as "L" level) when T=T1, the potential under the gate electrodes 104, 105 of φH1 becomes deep. Further, because the potential under the gate electrode 104 is deeper than the potential under the gate electrode 105, the signal charge is accumulated under the gate electrode 104 of φH1.

When T=T2, the horizontal transfer clock φH1 of the first phase is of L level and the horizontal transfer clock φH2 of the second phase is of H level. Thus, the potential under the gate electrodes 104, 105 of φH1 becomes shallow and the potential under the gate electrodes 104, 105 of φH2 becomes deep. Consequently, the signal charge accumulated under the gate electrode 104 of φH1 is transferred to the gate electrodes 104, 105 of φH2. Because the potential of the portion under the gate electrode 104 is deeper than the potential of the portion under the gate electrode 105, the signal charge is accumulated under the gate electrode 104 of φH2.

When T=T3, the horizontal transfer clock φH1 of the first phase is of H level and the horizontal transfer clock φH2 of the second phase is of L level. Thus, the potential under the gate electrodes 104, 105 of φH1 becomes deep and the potential under the gate electrodes 104, 105 of φH2 becomes shallow. Further, because the potential of the portion under the gate electrode 104 is deeper than the potential of the portion under the gate electrode 105, the signal charge accumulated under the gate electrode 104 of φH2 is transferred to the gate electrodes 104, 105 of φH1 and accumulated under the gate electrode 104.

After T=T4, the same operation is repeated. By this series transfer operation, the horizontal transfer of the signal charge by one horizontal picture element is carried out in one cycle of the horizontal transfer clocks φH1, φH2. The signal charge transferred horizontally is supplied successively to a charge detecting portion (not shown) through a horizontal output gate and converted to a signal voltage at this charge detecting portion so as to produce a CCD output.

However, the CCD sensor has a problem that the frame rate drops with a tendency of increased picture elements in recent years. If the frame rate drops, feedback at the time of photometry upon exposure adjustment is delayed in, for example, a camera system equipped with the CCD area sensor. Further, if the frame rate drops, the signal charge accumulation time is prolonged, so that deterioration of picture quality due to a dark signal is a problem to be solved.

As a method for increasing the frame rate in a multi-picture element CCD area sensor, there are a method of selectively reading the signal charge from picture element in the vertical direction and a method of thinning lines in the vertical direction by selectively throwing out the signal charge transferred from the vertical transfer register to the horizontal transfer register in the unit of each line, to a charge discharging portion provided beside the horizontal transfer register.

On the other hand, as a method for increasing the frame rate by reducing the output period of one horizontal line (1H), there is only a method of raising the frequency of the horizontal transfer clocks φH1, φH2 for driving the horizontal transfer register, that is, the horizontal drive frequency. However, if the horizontal drive frequency is raised, power consumption is increased and further in a signal processing system at the following step, clamp or sampling margin diminishes so that the CDS (correlated double sampling) becomes difficult.

SUMMARY OF THE INVENTION

In view of such aspects, it is an object of the present invention to provide a CCD imaging device which can make waveforms of outputs from the CCD imaging device upon a normal drive and an N-time speed drive and can carry out the sampling with sufficiently securing a period for a correlated double sampling and which reduces a horizontal scanning period to thereby make a feedback of an automatic control and a monitor output faster and is suitable for high picture quality by increasing the number of pixels.

It is another object of the present invention to provide a charge transfer device which can reduce an output period without changing a drive frequency and to provide a solid-state imaging device which can increase a frame rate resulting from reduction of an output period of one horizontal line by using the above charge transfer device as a horizontal transfer register.

According to a first aspect of the present invention, a charge transfer device having a charge transfer portion in which a plurality of electrode pairs are formed above a transfer channel includes means for commonly wiring the plurality of electrode pairs forming N (N=2, 3, 4, . . . natural numbers) bits of the charge transfer portion so that electrode pairs of each half bit can be independently, driven at every N bits, means for, in a normal operation, inputting the electrode pairs of each half bit with the same drive pulse to operate it by a two-phase complementary drive, and means for, in an N-time speed operation, inputting the electrode pairs of N bits with N pairs of complementary drive pulses to operate them by a 2N-phase complementary drive.

According to a second aspect of the present invention, a method of driving a charge transfer device having a charge transfer portion in which a plurality of electrode pairs are formed above a transfer channel and arranged such that the plurality of electrode pairs forming N (N=2, 3, 4, . . . natural numbers) bits of the charge transfer portion are wired at every N bits so that electrode pairs of each half bit can be independently driven at every N bits, includes a step of, in a normal operation, inputting the electrode pairs of each half bit with the same drive pulse to operate it by a two-phase complementary drive, and a step of, in an N-time speed operation, inputting the electrode pairs of N bits with N pairs of complementary drive pulses to operate them by a 2N-phase complementary drive.

According to a third aspect of the present invention, a charge transfer device, includes an electrode structure formed of electrode pairs for first and second phases repeatedly and alternately arranged above a transfer channel in its transfer direction of and arranged such that the electrode pairs for the first phase located across the electrode pairs for the second phase can be independently driven, means for applying a DC voltage to the electrode pairs for the second phase, and means for supplying transfer clocks having a phase reverse each other to each of the electrode pairs for the first phase located across each of the electrode pairs for the second phase.

According to a fourth aspect of the present invention, a solid-state imaging device includes an imaging unit formed of a plurality of pixels for converting incident light into signal charges, and a charge transfer portion for transferring the signal charges read out from the plurality of pixels. The charge transfer portion having an electrode structure formed of electrode pairs for first and second phases repeatedly and alternately arranged above a transfer channel in its transfer direction of and wired such that the electrode pairs for the first phase located across the electrode pairs for the second phase can be independently driven, a mode setting unit for setting an operation mode, and means for, when the mode setting unit sets a first operation mode, supplying a DC voltage or a transfer clock having a phase reverse to that of the transfer clock for the first phase to the electrode pair for the second phase and supplying a transfer clock having the same phase as that of the transfer clock to each of the electrode pairs located across the electrode pair for the second phase and for, when the mode setting unit sets a second operation mode, applying a DC voltage to the electrode pairs for the second phase and supplying the transfer clock having the reverse phase to each of the electrode pairs for the first phase located across the electrode pair for the second phase.

According to a fifth aspect of the present invention, a method of driving a solid-state imaging device which has an imaging unit formed of a plurality of pixels for converting incident light into signal charges, and a charge transfer portion for transferring the signal charges read out from the plurality of pixels and in which the charge transfer portion has an electrode structure formed of electrode pairs for first and second phases repeatedly and alternately arranged above a transfer channel in its transfer direction of and wired such that the electrode pairs for the first phase located across the electrode pairs for the second phase can be independently driven, includes a step of, in a first operation mode, supplying a DC voltage or a transfer clock having a phase reverse to that of a transfer clock for the electrode pairs for the first phase to the electrode pairs for the second phase and supplying a transfer clock having the same phase as that of the transfer clock to each of the electrode pairs located across the electrode pair for the second phase, and a step of, in a second operation mode, applying a DC voltage to the electrode pairs for the second phase and supplying transfer clocks having the reverse phase to each of the electrode pairs for the first phase located across the electrode pair for the second phase.

BRIEF DESCRIPTION OF THE DRAWINGS

FIG. 7 is a waveform diagram of a 2-phase transfer clock;

FIGS. 12A, 12B are diagrams used to explain a transfer from a vertical CCD register to a horizontal CCD register in a double speed operation according to the embodiment of the CCD imaging device of the present invention, wherein FIG. 12A is a potential diagram of a final stage of the vertical CCD register and a horizontal CCD register and FIG. 12B is a timing chart showing a part of a vertical drive clock pulse and a horizontal drive clock pulse;

FIG. 13 is a diagram showing a horizontal drive clock pulse and a CCD output waveform in a normal operation of the embodiment of the CCD imaging device of the present invention;

FIGS. 18A, 18B are waveform diagrams of a horizontal transfer clock relating to the fifth embodiment of the present invention, wherein FIG. 18A shows a case of a normal operation mode and FIG. 18B shows a case of a frame rate increase operation mode;

FIGS. 20A, 20B are diagrams for explaining the case of the normal operation mode, wherein FIG. 20A is a timing chart and FIG. 20B is a potential diagram;

FIGS. 21A, 21B are diagrams for explaining the case of the frame rate increase operation mode, wherein FIG. 21A is a timing chart and FIG. 21B is a potential diagram;

DETAILED DESCRIPTION OF THE PREFERRED EMBODIMENTS

Hereinafter, the embodiments of a CCD imaging device according to the present invention will be described with reference to the accompanying drawings.

Figure 9:
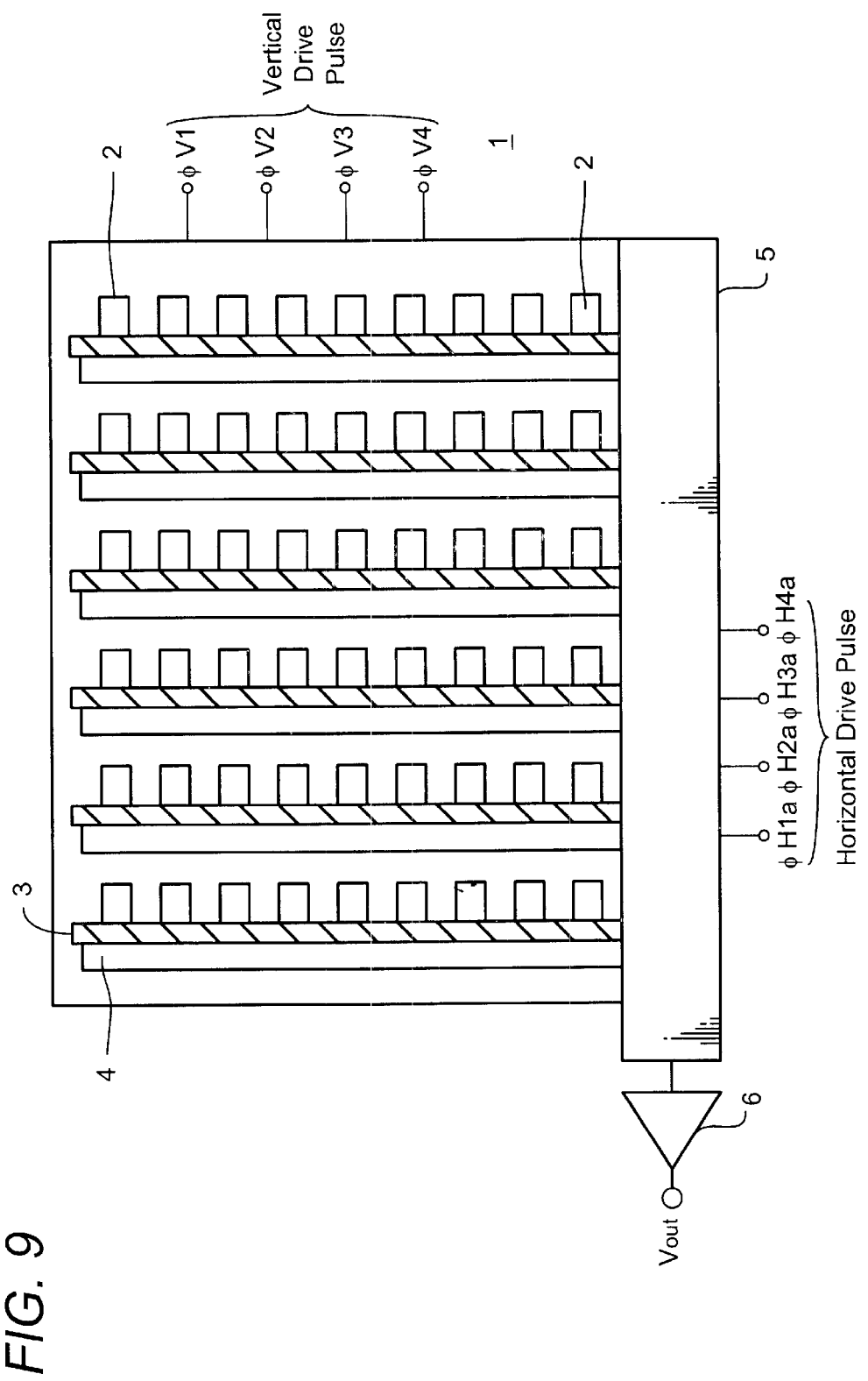
FIG. 9 is a schematic construction view (plan view) showing a first embodiment of a CCD imaging device according to the present invention.

FIG. 9 shows generally a CCD imaging device 1 according to the present embodiment. This CCD imaging device 1 is based on a so-called inter-line transfer system. A plurality of light receiving portions 2 each of which is made of a photo sensor and serving as a picture element are arranged in a matrix fashion and a vertical CCD register 4 is provided at every column of the light receiving portions 2 through a read-out gate 3 disposed adjacent each column of the light receiving portions 2. Each of the vertical CCD registers 4 is connected to a horizontal CCD register 5. A signal charge transferred through the horizontal CCD register 5 is converted through an output circuit such as an amplifier 6 or the like to an output voltage $V_{out}$, and then outputted. The vertical CCD register 4 is driven by, for example, 4-phase vertical driving pulses $\phi V1$, $\phi V2$, $\phi V3$, $\phi V4$.

According to the present embodiment, a structure of the horizontal CCD register 5 has a feature.

Figure 10:
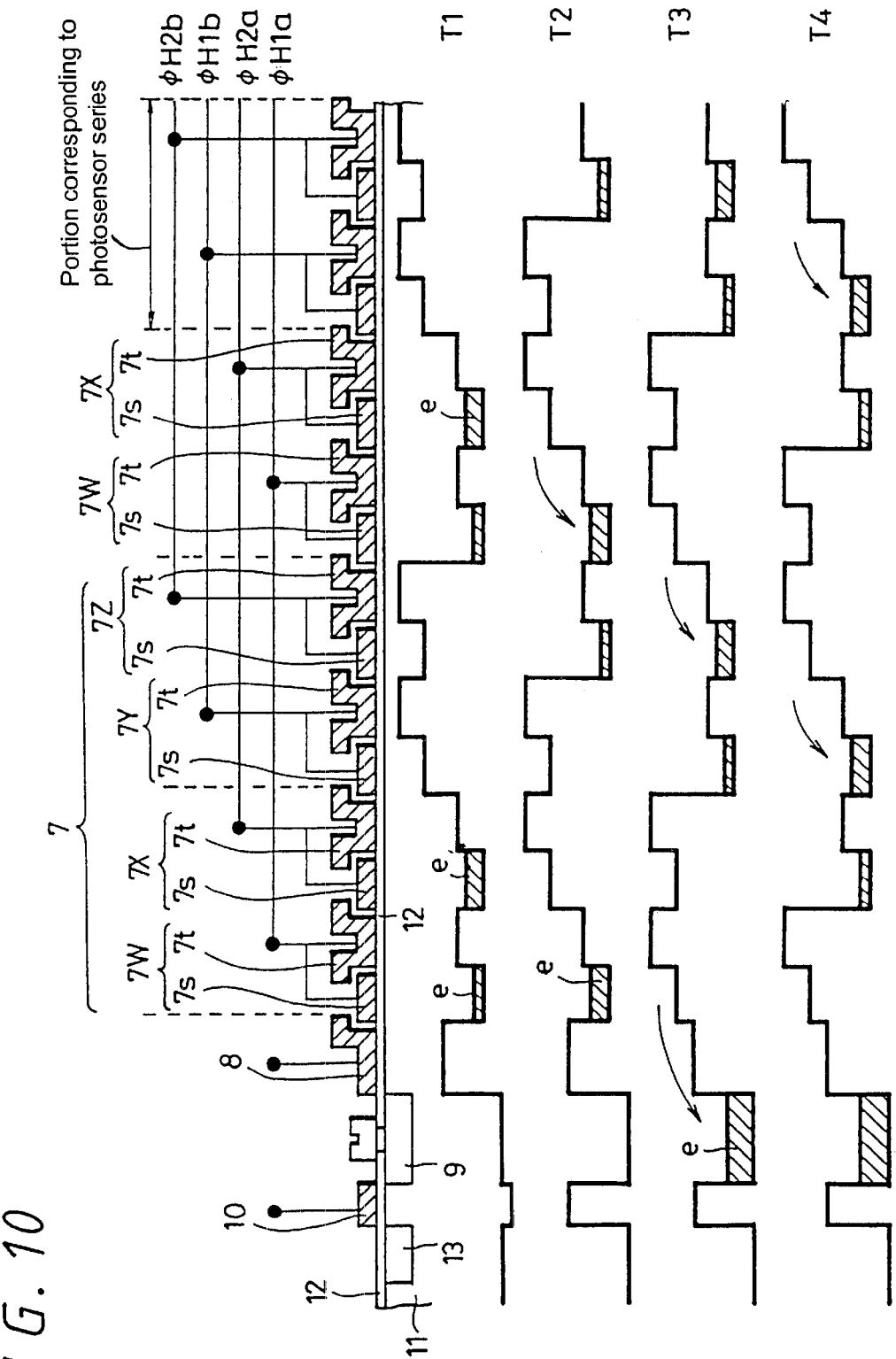
FIG. 10 is a potential diagram in the transfer direction of the horizontal CCD register according to the embodiment of the CCD imaging device of the present invention.

That is, as shown in FIG. 10, the horizontal CCD register 5 comprises a plurality of transfer electrodes 7 which are arranged in the electrode transfer direction, to form a plurality of transfer portions, 7W, 7X, 7Y, 7Z. Each of the transfer electrodes 7 comprises a storage electrode 7s which is made of poly crystalline silicone of a first layer and a transfer electrode 7t made of polycrystalline silicone of a second layer formed on a semiconductor substrate 11 through an insulating film 12.

Wiring is formed so that four independent pulses, a first drive pulse $\phi 4H1a$, a second drive pulse $\phi H2a$, a third drive pulse $\phi H1b$ and a fourth drive pulse $\phi H2b$ which are independent one another are applied to the transfer electrodes 7 of the transfer portions 7W, 7X, 7Y, 7Z, at repeating of four and that the first drive pulse $\phi H1a$ is; applied to the final stage transfer portion 7W in the transfer electrode 7. That is, the transfer portion to which the first drive pulse $\phi H1a$ is applied is assumed to be 7W and the transfer portions to which the second, third and fourth drive pulses $\phi H2a$, $\phi H1b$, $\phi H2b$ are applied are referred to as 7X, 7Y and 7Z.

Two adjacent transfer portions compose one bit and the two transfer portions correspond to the vertical CCD register 4 at each column.

A horizontal output gate portion 8 is formed adjacent to the transfer portion 7W at the final stage and further, a floating diffusion (FD) region 9 constituting a charge/voltage conversion portion, a reset gate portion 10 to which a reset gate pulse $\phi RG$ is applied and a reset drain region 13 are formed.

A signal charge transferred to the transfer portion 7W at the final stage is transferred to the floating diffusion region 9 through the horizontal output gate portion 8. After charge/voltage conversion is carried out in the floating diffusion region 9 and a signal is read, the charge in the floating diffusion region 9 is reset in the reset drain region 13 through the reset gate portion 10.

Figure 11:
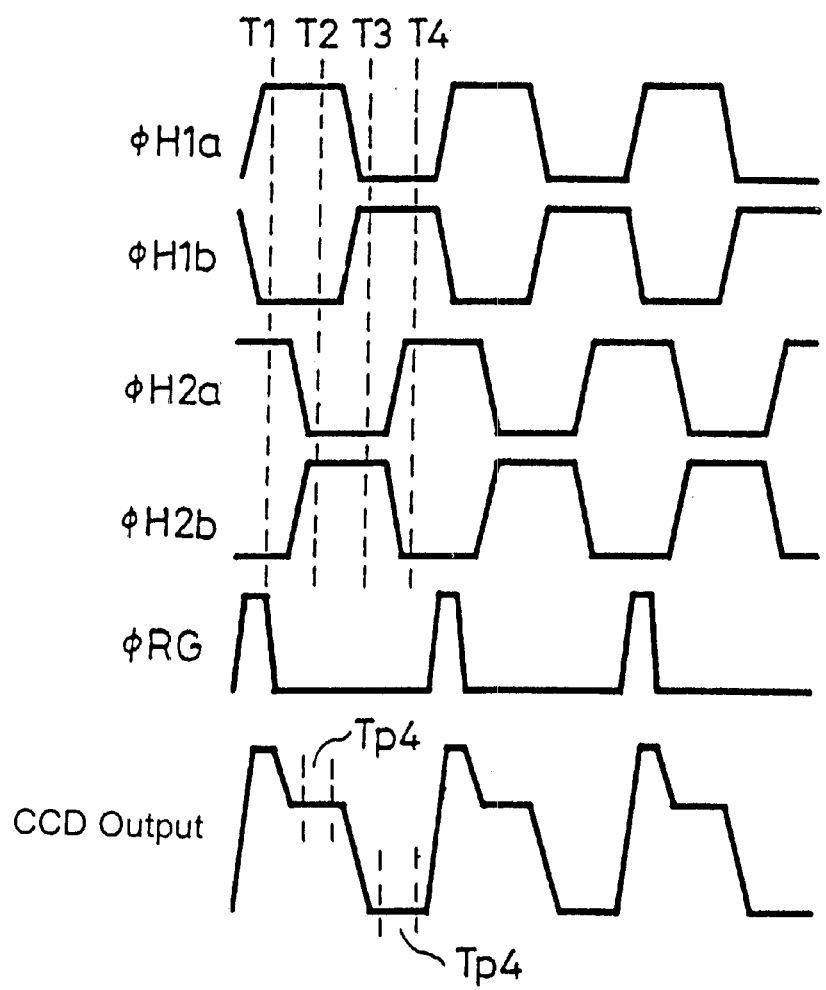
FIG. 11 is a diagram showing a horizontal drive clock pulse and a CCD output waveform in double speed operation according to the embodiment of the CCD imaging device of the present invention.

Next, an operation of the CCD imaging device 1 according to this embodiment, particularly an operation of the horizontal CCD register 5 will be described. FIG. 10 shows a potential diagram in the transfer direction of the horizontal CCD register 5 of the CCD imaging device 1 according to this embodiment. FIG. 11 shows the drive pulses $\phi H1a$, $\phi H1b$, $\phi H2a$, $\phi H2b$ in double speed operation of the horizontal CCD register 5 and a CCD output waveform. FIGS. 12A and 12B are diagrams used to explain the transfer from the vertical CCD register 4 to the horizontal CCD register 5. FIG. 13 shows the drive pulses $\phi H1$, $\phi H2$ under a normal operation of the horizontal CCD register and a CCD output waveform.

Figure 1:
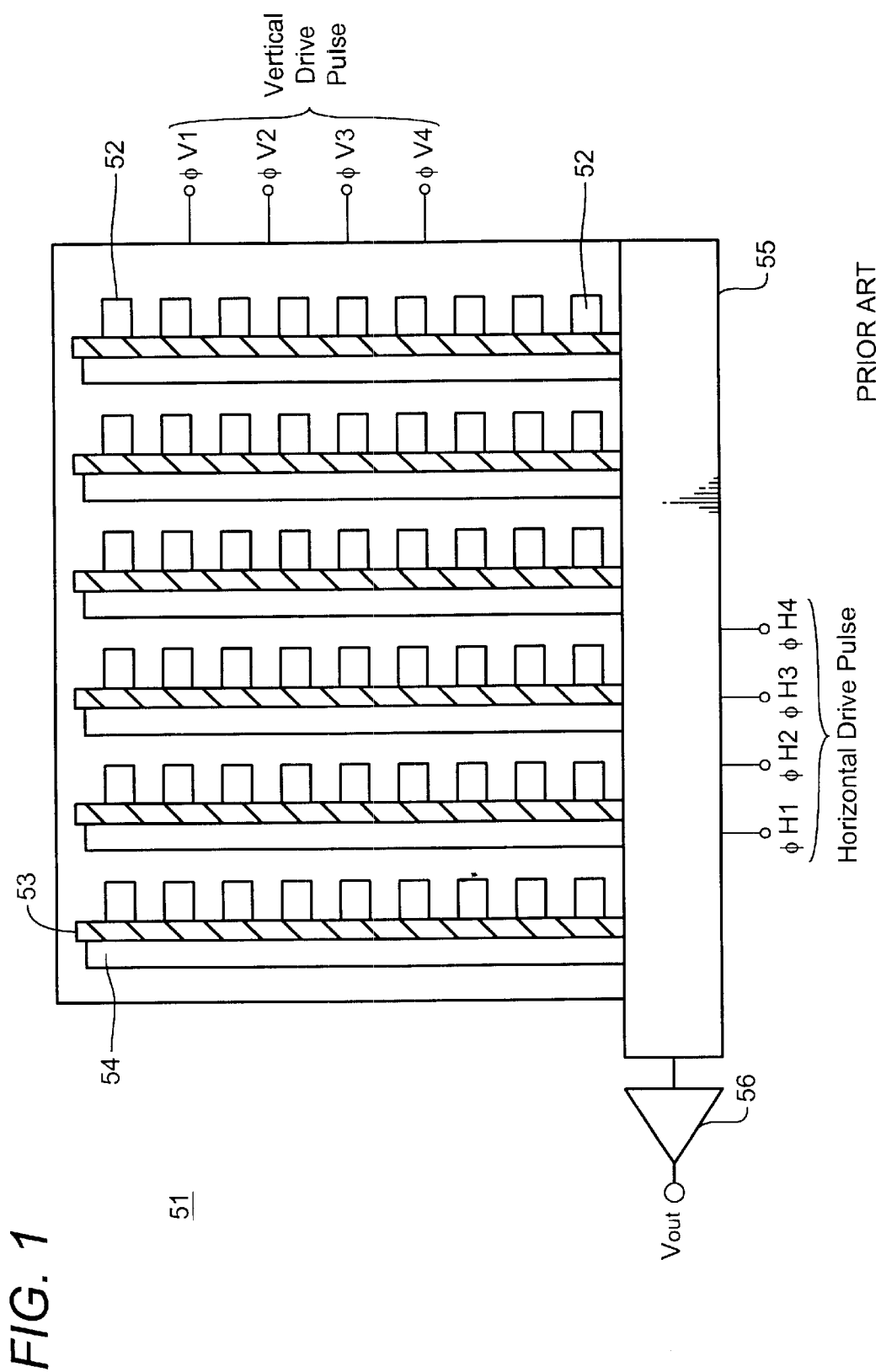
FIG. 1 is a schematic construction diagram (plan view) showing an example of a CCD imaging device.
Figure 2:
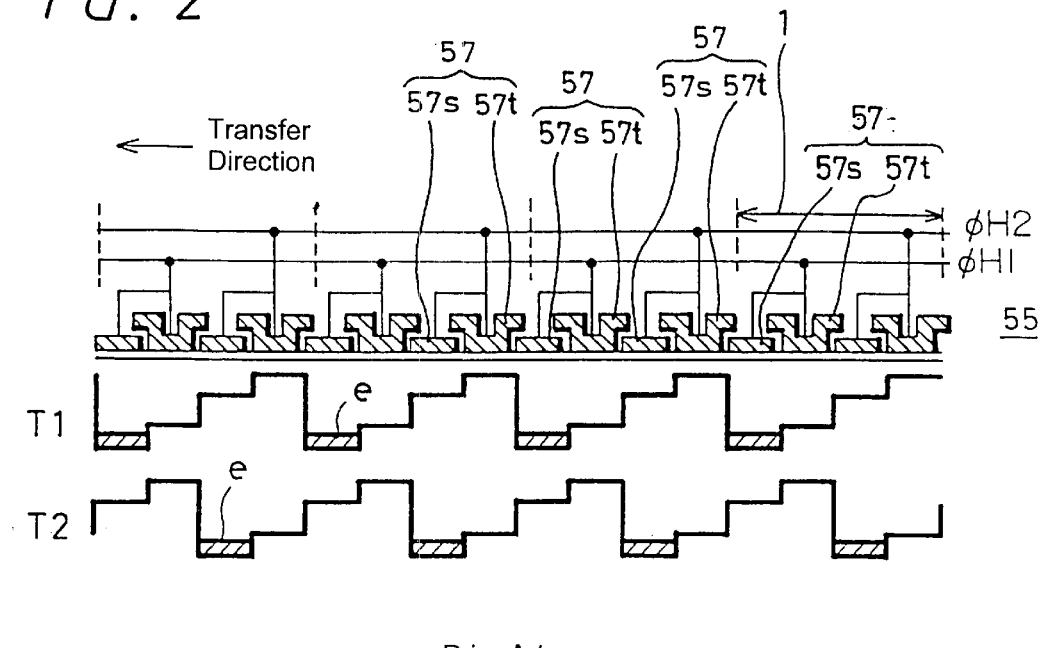
FIG. 2 is a potential diagram in the transfer direction of a conventional horizontal CCD register in a CCD imaging device.
Figure 3:
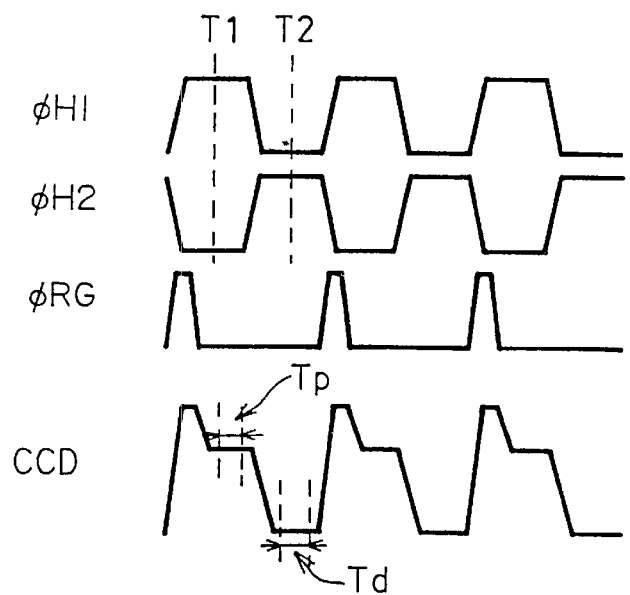
FIG. 3 is a diagram illustrating a conventional horizontal drive clock pulse and a CCD output waveform of the CCD imaging device.
Figure 4:
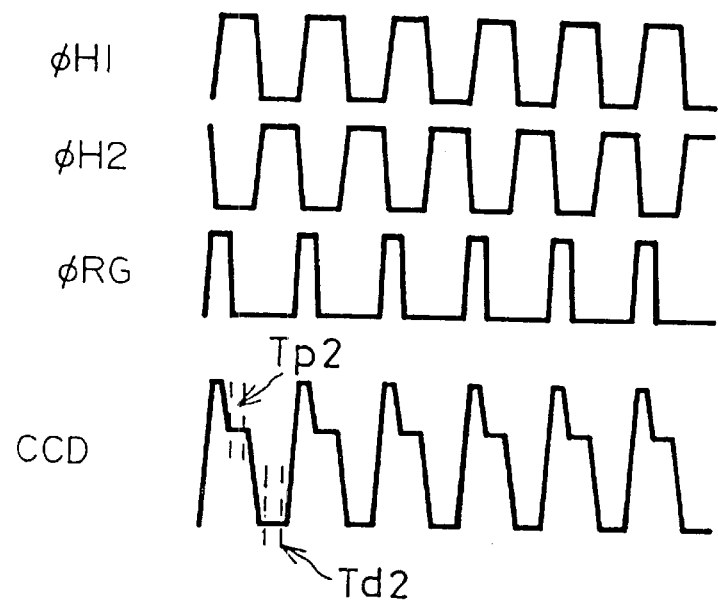
FIG. 4 a diagram illustrating a horizontal drive clock pulse and a CCD output waveform of a CCD imaging device in a double speed operation.
Figure 5:
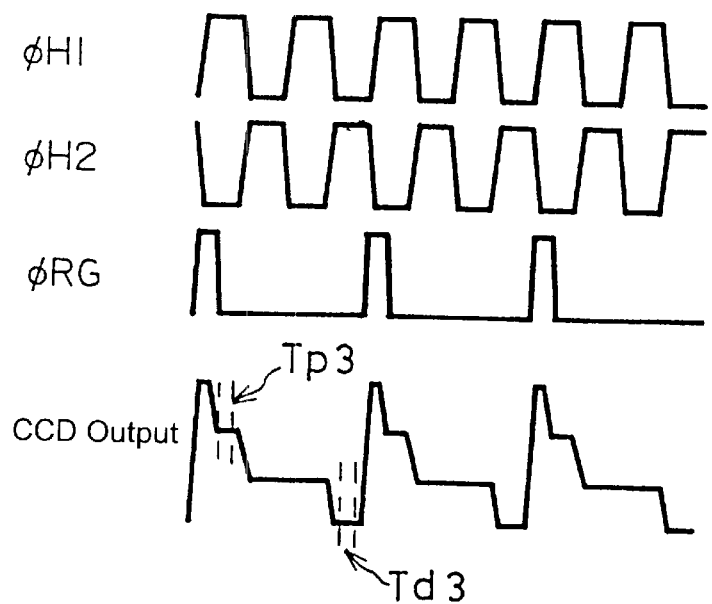
FIG. 5 is a diagram illustrating a horizontal drive clock pulse and a CCD output waveform of a CCD imaging device in FD adding operation.
Figure 6:
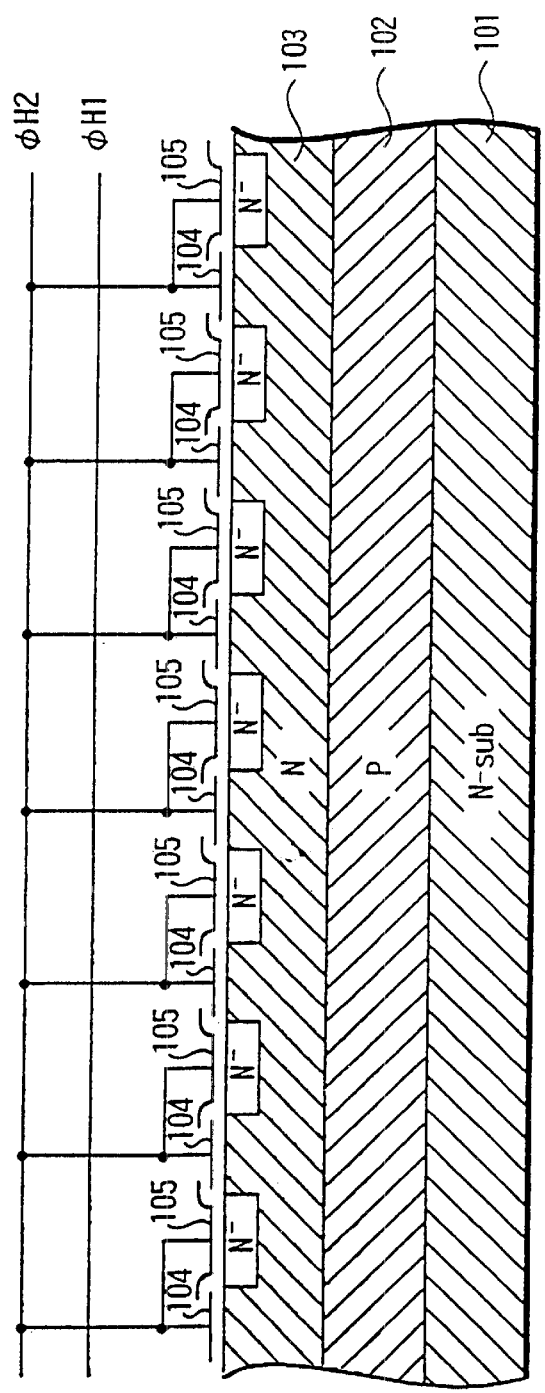
FIG. 6 is a sectional view of a horizontal transfer register.
Figure 8:
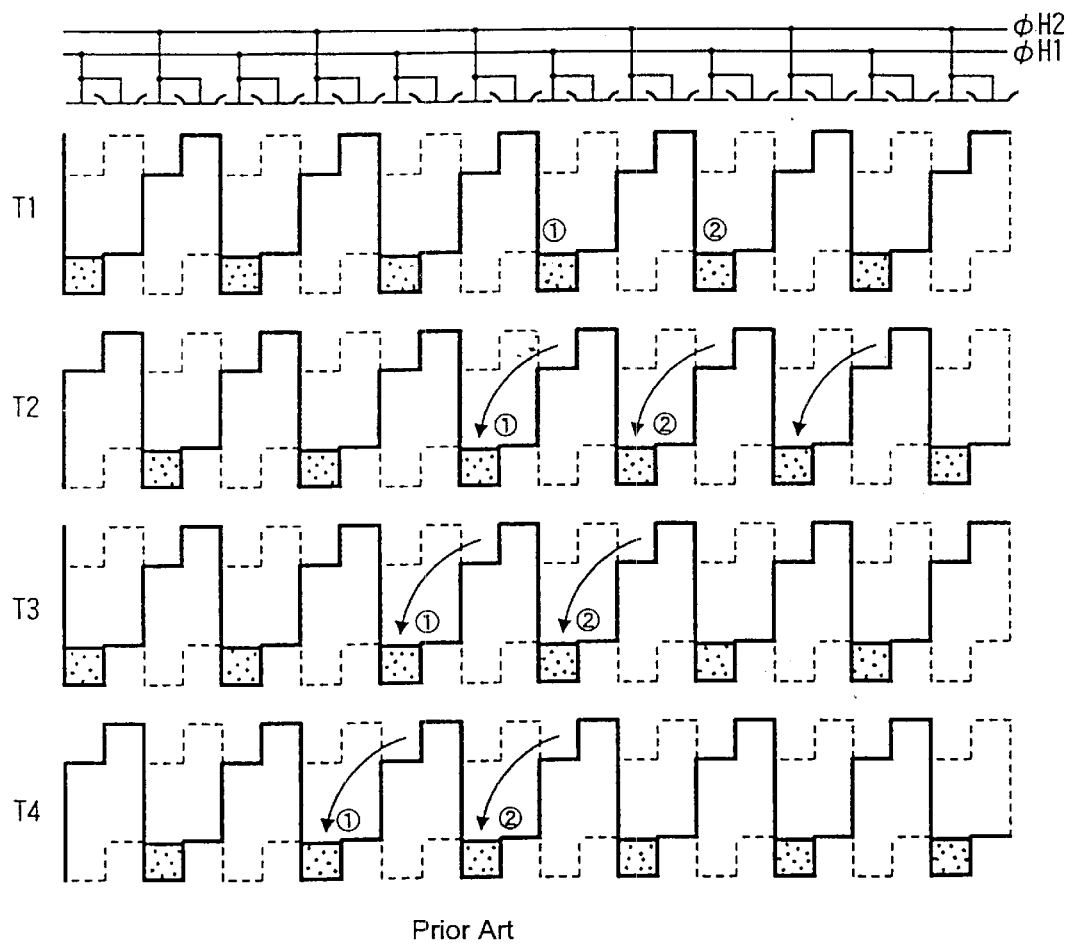
FIG. 8 is a potential diagram for explaining an operation of the horizontal transfer register shown in FIG. 6.

In the normal operation in which transfer is conducted at a normal speed, as shown in FIG. 13, the first drive pulse $\phi H1_a$ and the third drive pulse $\phi H1b$ are of the same clock pulse and the second drive pulse $\phi H2a$ and the fourth drive pulse $\phi H2b$ are of the same clock pulse. Then, the first and third drive pulses $\phi H1a$, $\phi H1b$ and the second and fourth drive pulses $\phi H2a$, $\phi H2b$ are made in opposite phase to each other, so that a so-called two-phase drive pulse is formed. Then, the signal charge is transferred by a so-called two-phase complementary drive. This drive is the same as the drive shown in FIGS. 2 and 3.

Next, the double speed operation will be described. The drive pulses ($\phi H1a$, $\phi H2a$, $\phi H1b$, $\phi H2b$ are set as shown in FIG. 11. That is, the first drive pulse $\phi H1a$ and the third drive pulse $\phi H1b$ are set in opposite phase to each other and the second drive pulse $\phi H2a$ and the fourth drive pulse $\phi H2b$ are set in opposite pulse to each other, while a set of the first and third drive pulses $\phi H1a$, $\phi H1b$ and a set of the second and fourth drive pulses $\phi H2a$, $\phi H2b$ are transferred in phase from each other (transferred by ½ of a half wavelength of the pulse in this embodiment). Charges are transferred by the so-called four-phase complementary drive.

As shown in FIGS. 10, 11, at a time T1, the first drive pulse $\phi H1a$ is of high level, the third drive pulse $\phi H1b$ is of low level, the second drive pulse φH2a is of high level and the fourth drive pulse φH2b is of low level. Potentials of the transfer portions 7W, 7X to which φH1a and φH2a are applied become-deep. Thus, a signal charge e corresponding to each picture element is transferred to the portion under the storage electrode 7s of the transfer portions 7W, 7X to which φH1a, φH2a are to be applied.

At this time, a reset gate pulse φRG is applied so that the potential of the reset gate portion 10 becomes deep and the charge in the floating diffusion region 9 is reset. This reset gate pulse φRG is of the same phase as a reset gate pulse φRG in the normal operation with respect to the drive pulse φH1a of the transfer portion 7W at the final stage.

Next, at a time T2, the second and fourth drive pulses φH2a, φH2b are reversed so that the φH2a becomes the low level and the φH2b becomes the high level. Thus, the potential of the transfer portion 7X to which φH2a is to be applied becomes shallow and the potential of the transfer portion 7Z to which φH2b is to be applied becomes deep. Therefore, the charge at the transfer portion 7X of the φH2a is transferred to the transfer portion 7W of the φH1a at the final stage so that signal charge of two picture elements are added. The signal charge e at a middle portion is transferred from the transfer portions 7W, 7X of the φH1a, φH2a to the transfer portions 7Z, 7W of the φH2b, φH1a.

The reset gate portion 10 is turned off so that accumulation of the signal charge in the floating diffusion region 9 is enabled.

At a time T3, the first and third drive pulses φH1a, φH1b are reversed so that the φH1a becomes the low level and the φH1b becomes the high level. The potential of the transfer portion 7W to which the φH1a is to be applied becomes shallow and the potential of the transfer portion 7Y to which the φH1b is to be applied becomes deep. The signal charge e of two picture elements added to the transfer portion 7W at the final stage is transferred to the floating diffusion region 9. At the same time, the charge of the transfer portions 7Z, 7W of the φH2b, φH1a are transferred to:the transfer portions 7Y, 7Z of the φH1b, φH2b.

At a time T4, the second and fourth drive pulses φH2a, φH2b are reversed again so that the φH2a becomes the high level and the φH2b becomes the low level. The potential of the transfer portion 7X to which the φH2a is to be applied becomes deep and the potential of the transfer portion 7Z to which. the φH2b is to be applied becomes shallow. Then, the signal charge e is transferred from the transfer portions 7Y, 7Z of the φH1b, φH2b to the transfer portions 7X, 7Y of the φH2a, φH1b.

After that, the same condition as the time T1 is attained. Again, the first and third drive pulses φH1a, φH1b are reversed so that the φH1a becomes the high level and the φH1b becomes the low level. The potential of the transmitting portion 7W to which the φH1a is to be applied becomes deep. The potential of the transfer portion 7Y to which the φH1b is to be applied becomes shallow. Then, the signal charge e is transferred from the transfer portions 7X, 7Y of the φH2a, φH1b to the transfer portions 7W, 7X of the φH1a, φH2a.

Because the reset gate pulse φRG is turned on, the signal charge e accumulated in the floating diffusion region 9 is reset.

By repeating the states of the times T1–T4, the signal charge e is successively transferred in the transfer direction.

Then, in a correlated double sampling circuit, the preset signal is clamped in an interval of the Tp4 of CCD output shown in FIG. 11 and a data signal is sampled in and interval of Td4 in FIG. 11.

Although in the normal operation, it takes one clock amount of φH1a to move from H1a to H1b, under the double speed in this embodiment, transfer is enabled in a time of half clock from T2 to T4. That is, the horizontal scanning interval can be made half.

Meantime, FIGS. 12A, 12B show a charge transfer state in which the charge is transferred from the vertical CCD register 4 to the horizontal CCD register 5 so that the aforementioned time T1 is regained. The transfer from the vertical CCD register 4 to the horizontal CCD register 5 is carried out in a horizontal blanking interval by the normal 4-phase drive.

FIG. 12A shows a potential diagram and FIG. 12B shows a drive clock pulse.

The drive pulse of the final stage transfer portion of the vertical CCD register 4 is φV3 and the signal charge is transferred to the transfer portion 7W to which the φH1b is to be applied, of the horizontal,CCD register.

After the horizontal CCD transfer is carried out in the horizontal scanning interval as set forth above, the horizontal blanking interval starts. First, at a time T5, the first and third drive pulses φH1a, φH1b become high level and then the second and fourth drive pulses φH2a, φH2b become low level. The signal charge is accumulated in the transfer portions 7W, 7Y to which the first and third drive pulses φH1a, φH1b are applied. On the other hand, in the vertical CCD register 4, the drive pulse φV2 of a transfer portion just before the final stage becomes high level and the drive pulse φV3 of the transfer portion at the final stage becomes low level, so that the signal charge exists in the transfer portion just before the final stage.

Then, at a time T6, the drive pulse φV3 of the transfer portion at the final stage of the vertical CCD register 4 becomes high level, so that the potential of the transfer portion at the final stage and the potential of the transfer portion just before the final stage become the same depth.

Successively, at time T7, the drive pulse φV2 of the transfer portion just before the final stage of the vertical CCD register 4 becomes low level so that the signal charge is transferred to the transfer portion 7Y of the φH1b of the horizontal CCD register 5 through the transfer portion at the final stage.

Next, at a time T8, the drive pulse φV3 at the final stage of the vertical CCD register 4 becomes low level also so that the remaining signal charge is transferred to the transfer portion 7Y of the φH1b of the horizontal CCD register 5.

After that, at the aforementioned time T1, of the drive pulses of the horizontal CCD register 5, the φH1b becomes low level and the φH2a becomes high level, so that the signal charge in the transfer portion 7Y of the φH1b is transferred to the transfer portion 7X of the φH2a.

After that, the horizontal scanning interval starts again so that transfer by the horizontal CCD register is carried out by the 4-phase complementary drive.

According to the above described embodiment, if the double speed operation and the normal operation are compared in the horizontal CCD register 5, the phases of the reset gate pulse φRG and the first drive pulse φH1a of the transfer portion at the final stage are not different between the double speed operation and the normal operation.

Thus, since the CCD output waveform depends on the phases of the drive pulse φH1a at the final stage of the horizontal CCD register 5 and the reset gate pulse φRG, in the system in which the phases of the Hla and the reset gate pulse φRG are not different from the usual case like this example, the CCD output waveform becomes a waveform of the same waveform, and hence the clamp pulse of the correlated double sampling and the sampling pulse can be used in the same phase.

That is, an interval Tp5 for clamping a preset signal, and an interval Td5 for sampling a data signal in order to carry out the correlated double sampling have the same width as the intervals Tp4 and Td4 for the aforementioned double speed operation. Thus, even under the double speed operation, an interval for carrying out the correlated double sampling can be secured sufficiently like the normal operation.

From viewpoints of the system configuration, the frequency for use is desired to be the same. Since the same frequency pulse can be used in the normal operation and the double speed operation, the system can be simplified.

In the above embodiment, the double speed operation is carried out by the complementary drive of four phase. In principle, the horizontal scanning interval can be made 1/N by increasing the number of separation gates or transfer portions to which the drive pulse is to be applied independently so as to perform an N-time speed operation by complementary drive of 2N phase (N=2, 3, . . . ; natural number). For example, when a three-time speed operation is carried out, it is sufficient that drive pulses φH1a, φH2a, φH1b, φH2b, φH1c, φH2c are applied to respective transfer electrode successively while φH1a and φH2b, φH2a and φH1c, φH1b and φH2c are made opposite in phase to each other. Each pair of pulses having opposite phase relation is transferred by ⅓ half waveform.

In this case, the clamp pulse of the correlated double sampling and the sampling hold pulse can be used in the same phase in the normal operation and the N-time speed operation. Even in the N-time speed operation, a sufficient interval for the clamp pulse and the sampling hold pulse can be obtained like in the normal operation.

Because the horizontal scanning interval can be reduced to 1/N as described above, the feedback of AE, AWB, AF or the like is quickened. In addition, the monitor output to a liquid crystal display or the like is made to follow a camera movement.

Next, another embodiment of the CCD imaging device according to the present invention will be described.

In the above described embodiment, as shown in FIG. 10, horizontal two picture elements are added in the horizontal CCD register 5 in the case of the double speed operation. In a single-plate color CCD, color signals must be separated. Therefore, the CCD imaging device is composed as follows, for example.

Figure 14:
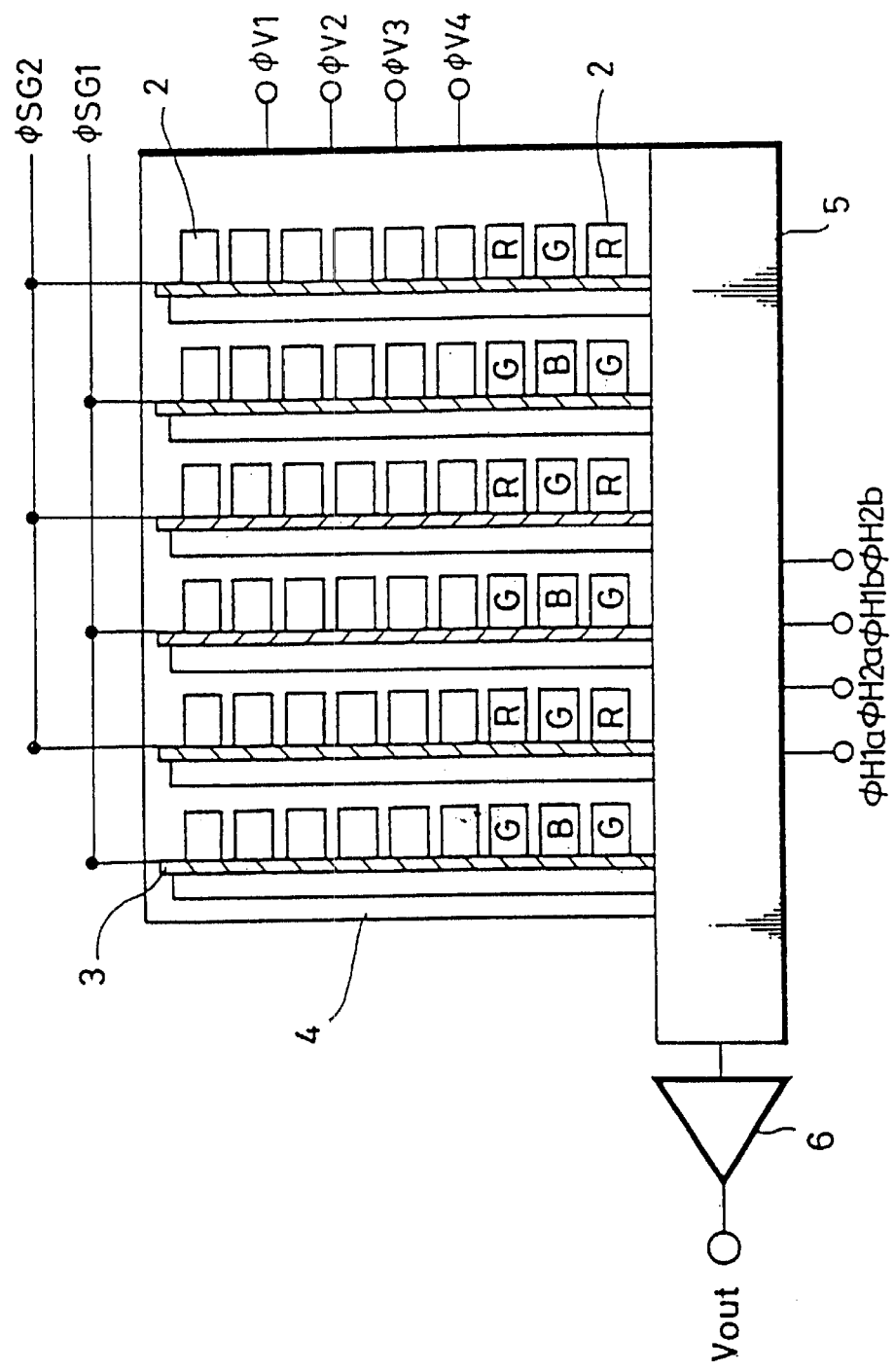
FIG. 14 is a schematic construction view (plan view) showing a second embodiment of the CCD imaging device according to the present invention.

In a CCD imaging device 210 shown in FIG. 14, when a signal charge is read from the light receiving portion 2 composed of a photo sensor to the vertical CCD register 4, the signal charge is read from the light receiving portion 2 at every other column.

For example, taking a case in which three color (R, G, B) filters are arranged as shown in the figure as an example (various patterns can be considered about arrangement of the R, G, B color filters), it is so constructed that a first drive pulse φSG1 and a second drive pulse φSG2 can be applied independently to the read-out gates 3 of the light receiving portions 2 at an odd number column and at an even number column, respectively.

In the double speed operation, the signals of the light receiving portions at the odd number column are read out by the driving pulse φSG1 and outputted through the horizontal CCD register 5. After that, the signals of the light receiving portions at the even number are read out by the driving pulse φSG2 and outputted through the horizontal CCD register 5. Consequently, the color signals of the respective light receiving portions are not mixed, and the single plate CCD can separate the color signals.

When the imaging device is desired to be driver under the normal operation mode or the standard mode (so-called two-phase drive), the first and second drive pulses φSG1 and φSG2 are applied at the same time, so that all the read-out gates 3 are turned on to thereby read the signals.

Figure 15:
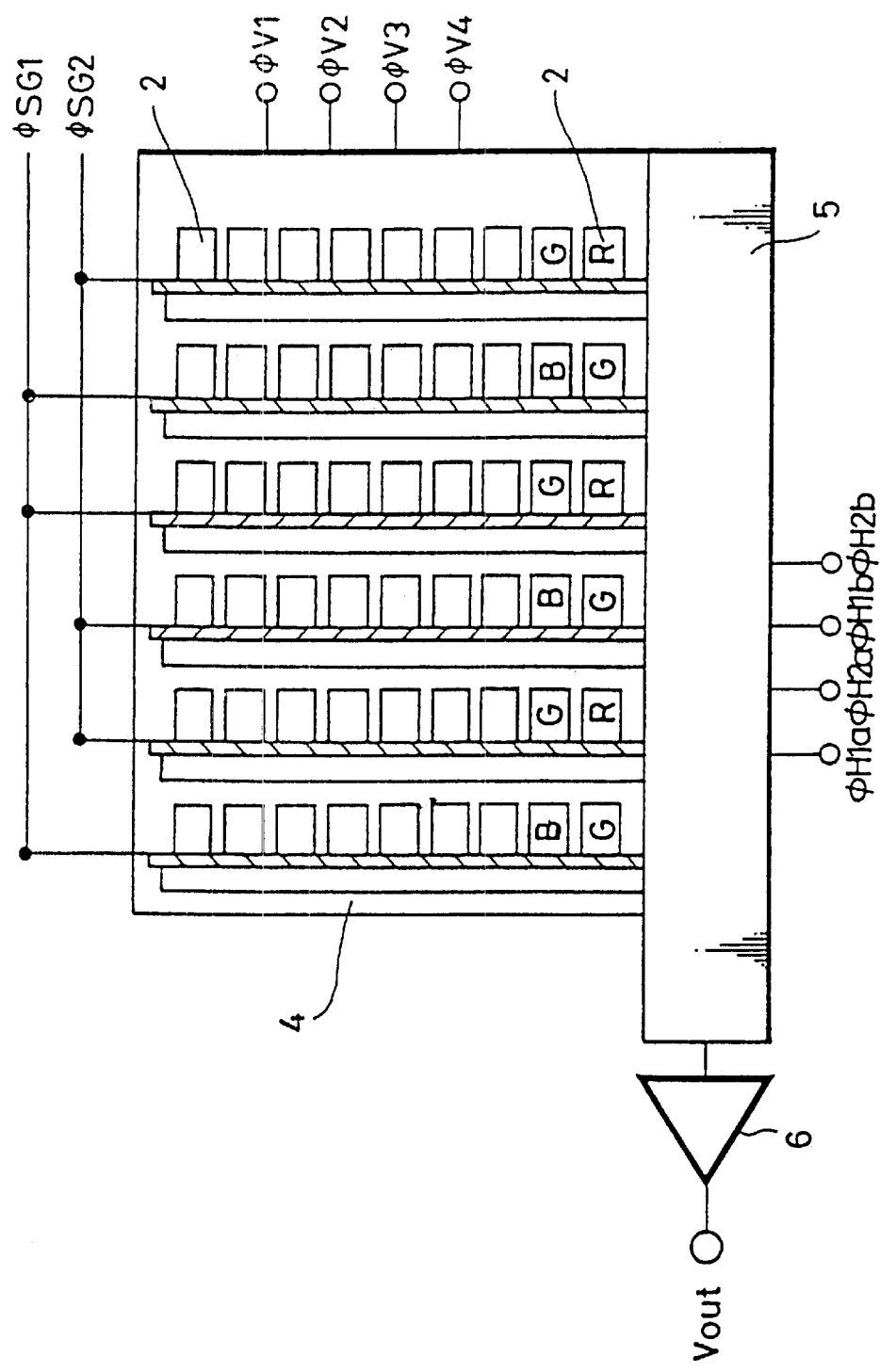
FIG. 15 is a schematic construction view (plan view) showing a third embodiment of the CCD imaging device according to the present invention.

As another structure for separation of color signals in the single plate color CCD, as shown in FIG. 15, a structure in which every two columns are read out can be employed.

In the CCD imaging device 310, to read the signal charge from the light receiving portion 2 made of a photo sensor to the vertical CCD register 4, the drive pulse to be applied to the read-out gate portion 3 changes at every third column, the drive pulse being φSG1 or φSG2.

That is, on the read-out gate 3, two columns to which the first drive pulse φSG1 and second the drive pulse φSG2 are to be applied respectively are arranged in pair such that they come alternately.

In the double speed operation, each pair of two neighboring column of the sensors are supplied with φSG1 or φSG2 alternately with a time lag so as to drive the read-out gate portion 3. As a result, the signals of each sensor column are not mixed and color signals can be separated in a single plate CCD. It is permissible to apply only any one of φSG1 and φSG2 for driving.

When the standard mode operation is carried out, the drive pulses φSG1 and φSG2 are applied at the same time so that all the read-out gate portions 3 are turned on so as to read.

Meantime, the CCD imaging devices 210, 310 shown in FIGS. 14, 15 can be applied to the N time speed operation. In this case, the read out gate is enabled to be driven at every second ~N column (for example, when triple speed is applied, every second, third or fourth is selected) and in the N-time speed operation, the read out gate of only a single column of the N columns is turned on so as to read only the 1/N column.

Figure 16:
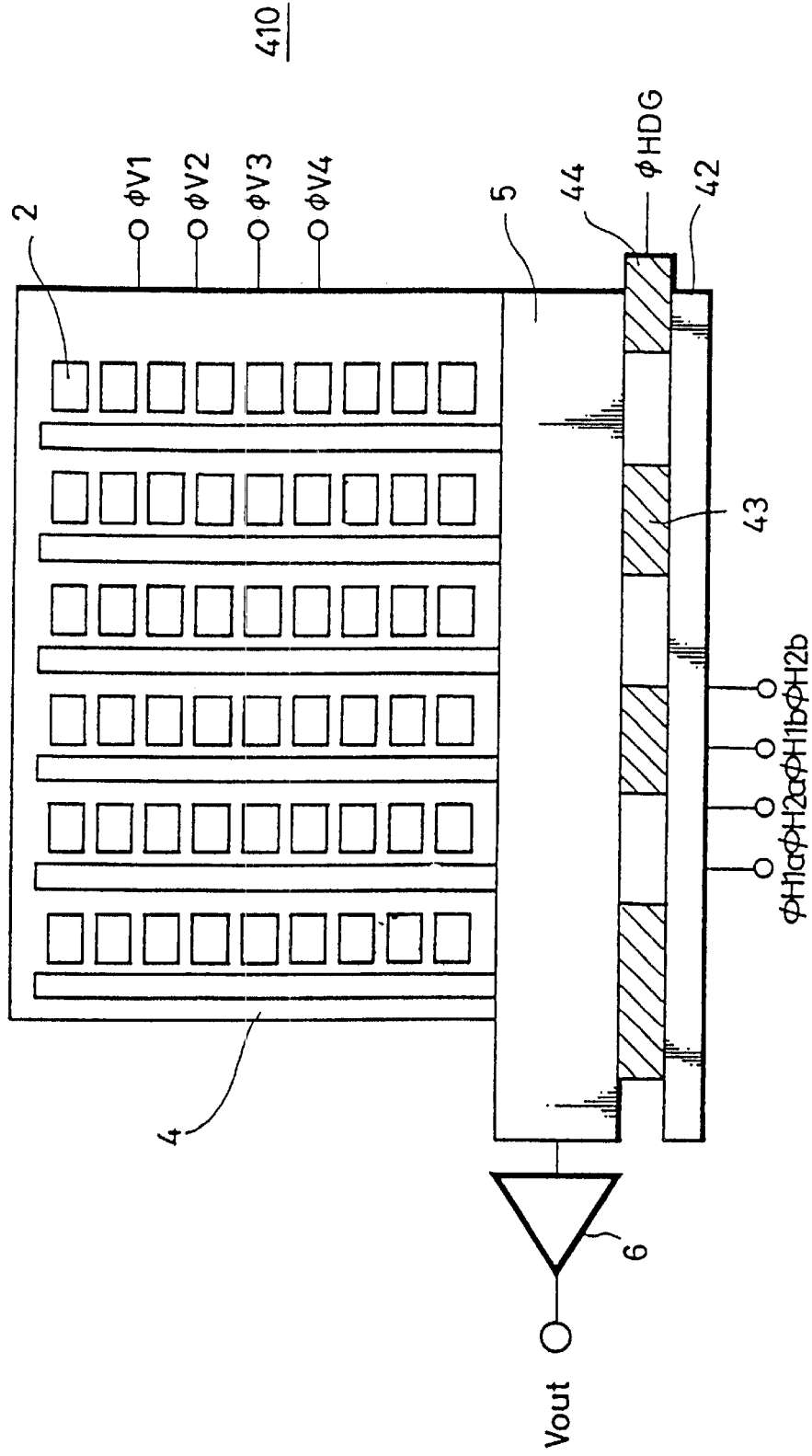
FIG. 16 is a schematic construction view (plan view) showing a fourth embodiment of the CCD imaging device according to the present invention.

As shown in FIG. 16, it is permissible to apply a structure in which a function.of throwing out every second column of the signal charge or every third column thereof is provided in a drain region provided under the horizontal CCD register. FIG. 16 shows an example of a structure in which every second column is thrown out.

The CCD imaging device 410 shown in FIG. 16 has such an arrangement that, under the horizontal CCD register 5 is formed in parallel therewith a drain region 42 through a channel stop 43 for blocking the signal charge from, for example, the vertical CCD register 4 of an odd number and a gate portion 44 for allowing the signal charge from the vertical CCD register 4 of even number to be discharged to the drain region 42.

A gate pulse φHDG is applied to the gate portion 44.

In the double speed operation, the signal charge transferred from the vertical CCD register 4 goes into the horizontal CCD register 5 and then outputted by the horizontal CCD register 5. At this time, the signal charge from the light receiving portion 2 corresponding to the odd number column is transferred to the horizontal CCD register 5 but the signal charge from the light receiving portion 2 corresponding to the even number column goes through the horizontal CCD register 5 and is thrown out to the drain region 42 through the gate portion 44. Therefore, in the horizontal CCD register 5, only the signal charge of the light receiving portion 2 of the odd number column is transferred and outputted.

By the a structure in which the signal charge of every second light receiving column is thrown out to the drain region 42 through the horizontal CCD.register 5, color signals can be separated in the single plate CCD without mixing signals of respective light receiving columns. In the standard mode, the gate portion 44 is turned off so that all the signal charges are transferred to the horizontal CCD register 5.

Although not shown here, in the case of gathering two columns in the neighborhood of the light receiving portion 2 and throwing out every third column as well, signal separation can be carried out in the same manner.

In the case when the CCD imaging device 410 shown in FIG. 16 is applied to the N-time speed operation, the signal charge of one column in the N columns of the light receiving portion 2 is transferred to the horizontal CCD register 5 and the signal charges of N-1 columns of the N columns remained are thrown out to the drain region 42.

The CCD imaging device according to the present invention is not restricted to the above described examples but may be modified in various ways within a range not departing from a gist of the present invention.

According to the CCD imaging device of the present invention, the horizontal scanning period can be reduced to 1/N, and therefore feedback of AE, AWB, AF and the like is quickened.

Further, the monitor output to a liquid crystal display or the like can follow a camera motion, so that it is possible to take pictures without losing a shutter chance.

Further, according to the present invention, a sufficient phase margin can be assured for the clamp pulse for clamping the CCD output and the sample hold pulse for sampling even in the N-time speed operation, and therefore production efficiency can be improved.

Further, in the normal operation and the N-time speed operation, the same clamp pulse for clamping the CCD output and the same sampling hold pulse for sampling can be used, and therefore the system can be simplified.

Figure 17:
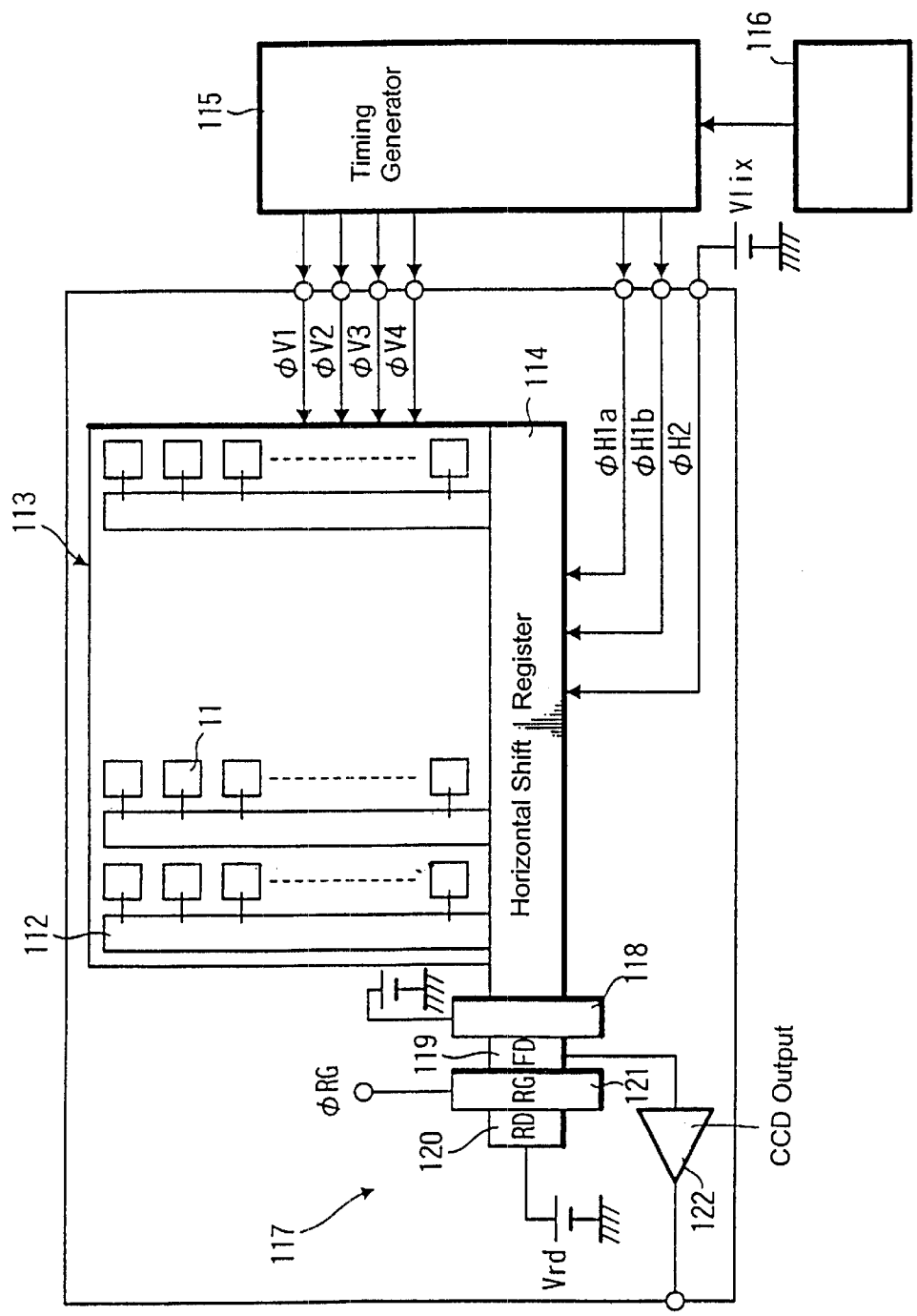
FIG. 17 is a schematic construction view showing a CCD area sensor according to a fifth embodiment of the present invention.

FIG. 17 is a schematic construction diagram showing a CCD area sensor of, for example, an inter-line transfer type according to the present invention. Referring to FIG. 17, an imaging area 113 comprises a plurality of sensor portions (picture elements) 111 which are arranged in a matrix for converting an incident light to a signal charge of a charging amount corresponding to the amount of the incident light and accumulating the same and a plurality of vertical transfer registers 112 which are provided on every vertical column of the sensor portions 111 for transmitting the signal charge read from each of the sensor portions 111 through a read out gate (not shown) vertically.

In this imaging area 113, each of the sensor portions 111 in made of, for example, a P-N junction type photo diode. The vertical transfer register 112 is driven by, for example, 4-phase vertical transfer clocks $\phi V1$–$\phi V4$ and the signal charge read from each of the sensor portions 111 is transferred successively in a part of horizontal blanking period by a part corresponding to one scanning line (1 line) each in the vertical direction. Below the imaging area 113 in this figure is disposed a horizontal transfer register 114.

The signal charge corresponding to one line is successively transferred from each of the plural vertical transfer registers 112 to the horizontal transfer register 114. The horizontal transfer register 114 is driven by horizontal transfer clocks $\phi H1a$, $\phi H1b$, $\phi H2$ so that the signal charges of one single line transferred from the plurality of vertical transfer registers 112 are transferred successively in the horizontal direction in the horizontal scanning period after the horizontal blanking period. In this example, as the horizontal transfer clock $\phi H2$, a DC voltage of a predetermined voltage value is supplied.

Figure 18A:
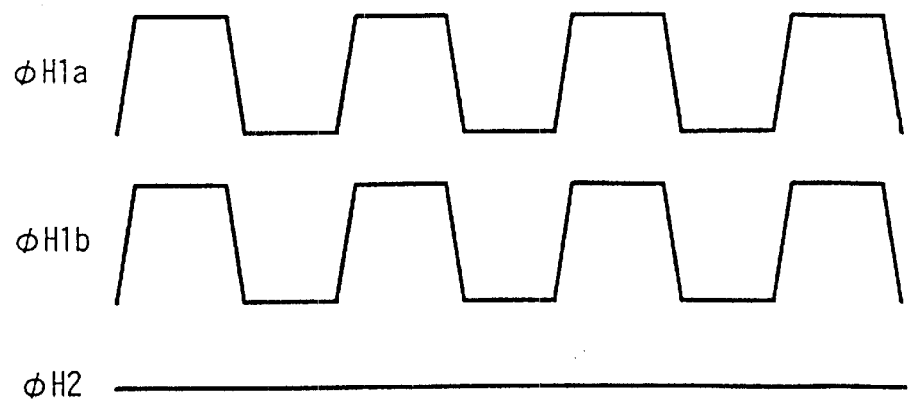
Figure 18B:
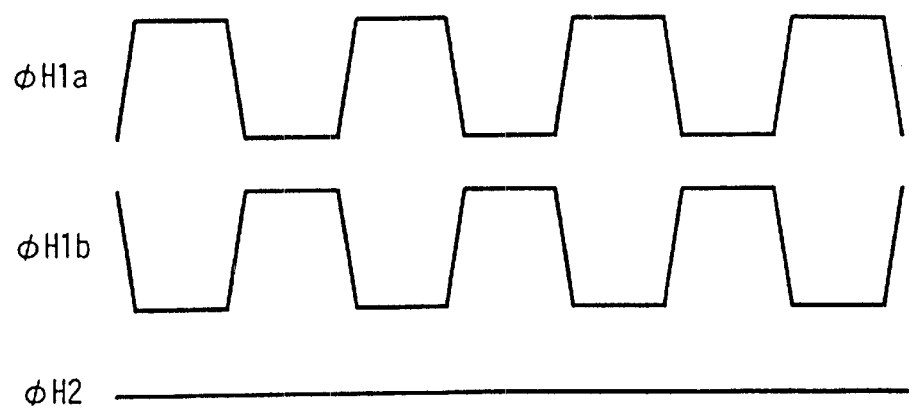

Vertical transfer clocks $\phi V1$–$\phi V4$ and horizontal transfer clocks $\phi H1a$, $\phi H1b$ are generated from a timing generator 115. When the normal operation mode is set by a mode setting unit 116, the timing generator 115 generates the horizontal transfer clocks $\phi H1a$, $\phi H1b$ same in phase as shown in FIG. 18A and when the frame rate increase mode is set, generates the horizontal transfer clocks $\phi H1a$, $\phi H1b$ opposite in phase as shown in FIG. 18B.

At an end of the between side of the horizontal transfer register 114 is provided a charge detecting portion 117 of, for example, a floating diffusion amplifier. This charge detecting portion 117 comprises a floating diffusion (FD) 19 which accumulates the signal charge supplied from the horizontal transfer register 114 through a horizontal output gate (HOG) 118, a reset drain (RD) 120 for draining the signal charge and a reset gate (RG) 121 provided between the floating diffusion 119 and the reset drain 120.

In this charge detecting portion 117, a predetermined reset drain voltage Vrd is applied to the reset drain 120 and a reset gate pulse $\phi RG$ is applied to the reset gate 121 in a detection frequency for the signal charge. Then, the signal charge accumulated in the floating diffusion 119 is converted to a signal voltage and delivered as a CCD output signal OUT through an output circuit 122.

Figure 19:
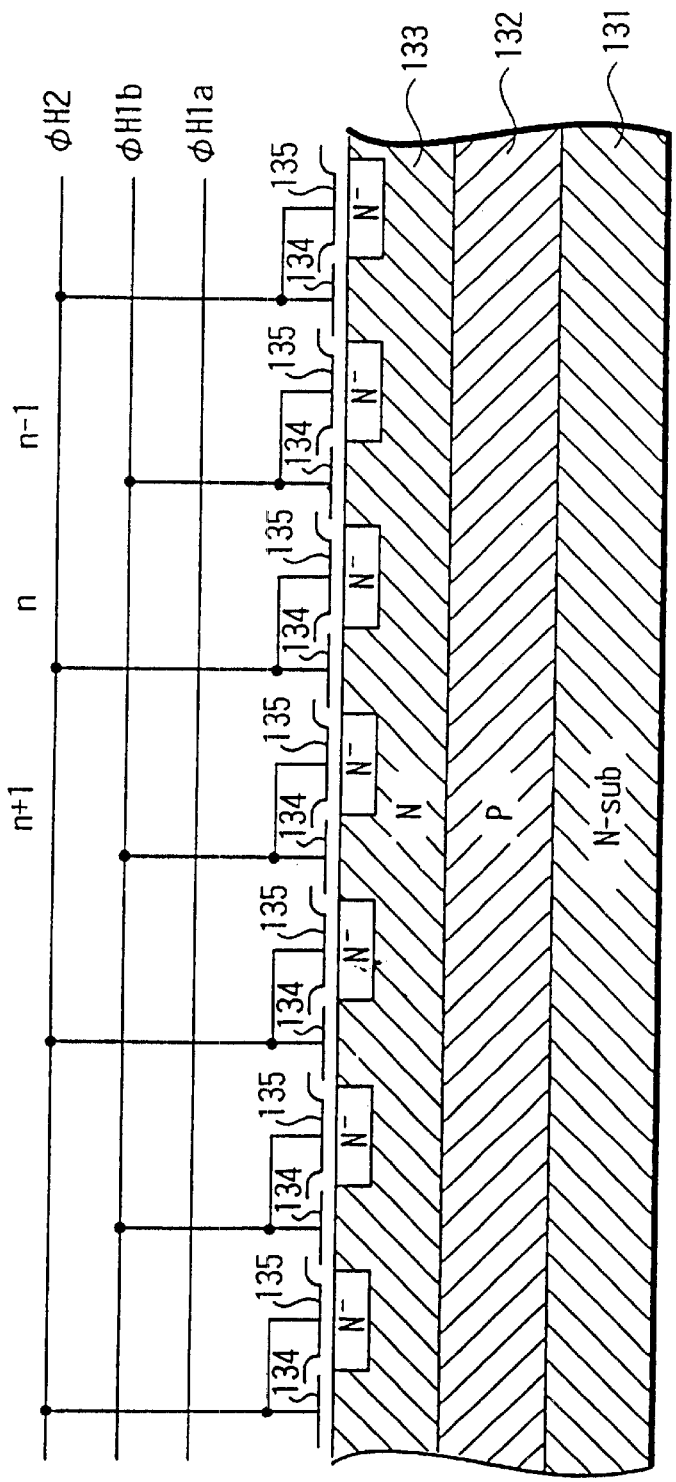
FIG. 19 is a sectional view of the horizontal transfer register.

FIG. 19 is a sectional view of a charge transfer apparatus of the present invention which is used as the horizontal transfer register 114. Referring to FIG. 19, on the surface of N type substrate 131 is formed an N type transfer channel 133 with a P type well 132 provided therebetween. On the N type transfer channel 133 are arranged gate electrodes 134, 135 of first and second layers made of polysilicone through a gate insulating film (not shown) alternately and repeatedly in the transfer direction. An N-impurity is ion-implanted into the surface of the transfer channel 133 below the gate electrode 135.

As for the arrangement of the gate electrodes 134, 135 of the two-layered structure, the gate electrodes 134, 135 adjacent to each other make a pair and wiring is placed so that the horizontal transfer clock $\phi H1$ ($\phi H1a$, $\phi H1b$) of a first phase and the horizontal transfer clock $\phi H2$ (DC voltage) of a second transfer are applied alternately to each pair of the gate electrodes 134, 135. Further, the wiring for the gate electrodes 134, 135 to which the horizontal transfer clocks $\phi H1a$, $\phi H1b$ of the first phase are to be applied are so structured that the horizontal transfer clock $\phi H1a$ and the horizontal transfer clock $\phi H1b$ are to be applied alternately.

That is, taking a step (n−1), a step n and a step (n+1) as an example in FIG. 19, the horizontal transfer clock $\phi H1a$ is applied to the gate electrodes 134, 135 of the step (n−1), the horizontal transfer clock $\phi H2$ is applied to the gate electrodes 134, 135 of the step n, and the horizontal transfer clock $\phi H1b$ is applied to the gate electrodes 114, 135 of the step (n+1). That is, wiring is placed so that the transfer step of the horizontal transfer clock $\phi H1$ on both sides of the transfer step of the horizontal transfer clock $\phi H2$ can be driven independently.

The transfer operations in the normal operation mode and the frame rate increase mode of the horizontal transfer register 114 having the aforementioned structure will be described.

Figure 20A:
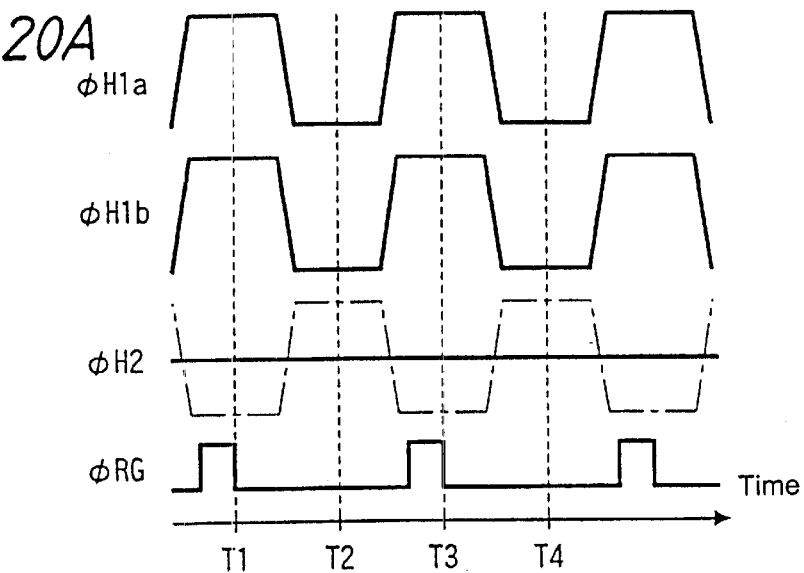
Figure 20B:
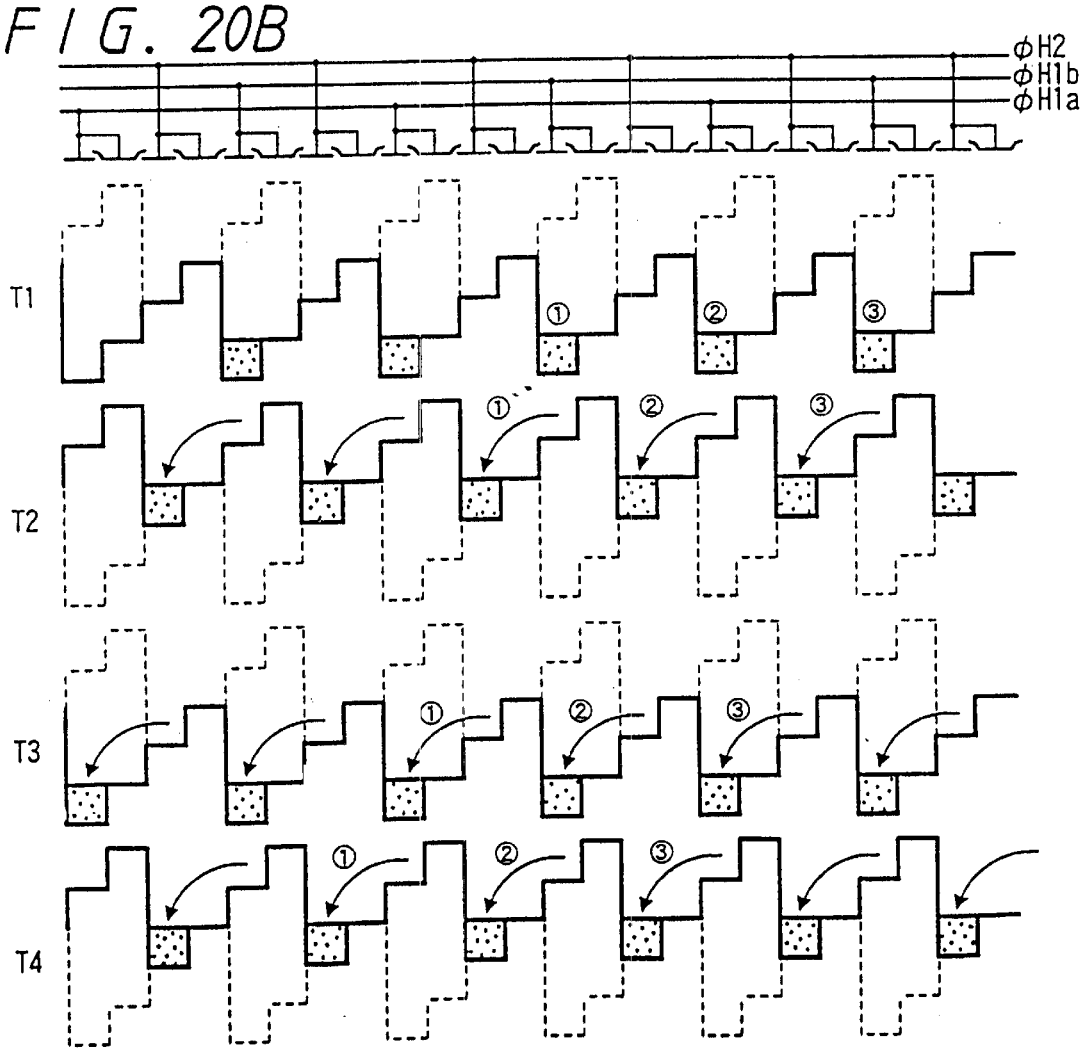

First, the transfer operation in the normal operation mode will be described with reference to a timing chart diagram of FIG. 20A and a potential diagram of FIG. 20B. When the normal operation mode is set by the mode setting portion 116, the timing generator 115 generates the horizontal transfer clocks φH1a, φH1b of the same phase as shown in FIG. 20A and supplies the same to the horizontal transfer register 114. Further, the horizontal transfer clock φH2 is fixed to a DC voltage Vfix of a predetermined voltage value.

When the horizontal transfer clock φH2 is fixed to a DC value, the potential under the gate electrodes 134, 135 to which the horizontal transfer clock φH2 is applied is set to a level between a potential when the horizontal transfer clocks φH1a, φH1b are at "H" level and a potential when the horizontal transfer clocks φH1a, φH1b are at "L" level, preferably a substantially middle level thereof. This can be realized by implanting an impurity or the clamp inside the CCD.

Because the horizontal transfer clocks φH1a, φH1b are at "H" level when T=T1, the potential under the gate electrodes 134, 135 of φH1a, φH1b becomes deeper than the potential under the gate electrodes 134, 135 of φH2. Further, because the N-impurity is ion-implanted in the portion under the gate electrode 135, the potential of a portion under the gate electrode 134 is deeper than that of the portion under the gate electrode 135. Thus, the signal charge of one line amount transferred from the vertical transfer register 112 to the: portion under the respective gate electrodes 134, 135 of φH1a, φH1b is accumulated under the gate electrode 134.

Because the horizontal transfer clocks φH1a, φH1b are at "L" level when T=T2, the potential under the gate electrodes 134, 135 of φH1a, φH1b becomes shallower than the potential under the gate electrodes 134, 135 of φH2. Thus, the signal charge accumulated under the gate electrode 134 of φH1a, φH1b is transferred to the portion under the gate electrodes 134, 135 of φH2. Because the potential of the portion under the gate electrode 134 is deeper than that of the portion under the gate electrode 135, the signal charge is accumulated under the gate electrode 134 of φH2.

Because the horizontal transfer clocks φH1a, φH1b become "H" level again when T=T3, the potential under the gate electrodes 134, 135 of φH1a, φH1b becomes deeper than that under the gate electrodes 134, 135 of φH2. Further because the potential under the gate electrode 134 is deeper than that under the gate electrode 135, the signal charge accumulated under the gate electrode 134 of φH2 is transferred to the gate electrodes 134, 135 of φH1a, φH1b and accumulated under the gate electrode 134.

The same operation is repeated after T=T4. By this series of transfer operation, within one cycle of the horizontal transfer clocks φH1a, φH1b, the horizontal transfer of the signal charge of one horizontal picture element amount is carried out. The signal charge of one horizontal picture element amount transferred horizontally is supplied successively to the charge detecting portion 117 through the horizontal output gate 118 and converted to a signal voltage at the charge detecting portion 117, and then delivered as a CCD output through an output circuit 122. In the charge detecting portion 117, the reset gate pulse φRG is applied to the reset gate (RG) 121 so that the floating diffusion (FD) 119 is reset in the period of the horizontal transfer clocks φH1a, φH1b.

Although, in the present example, the horizontal transfer clock φH2 is fixed to the DC value at the time of the normal operation mode, as shown by one dot, chain line of FIG. 20A, it is permissible to make the horizontal transfer clock φH2 as a clock in opposite phase of the horizontal transfer clocks φH1a, φH1b so that the gate electrodes 134, 135 of φH2 and the gate electrodes 134, 135 of φH1a, φH1b are subjected to the complementary 2-phase drive.

Figure 21A:
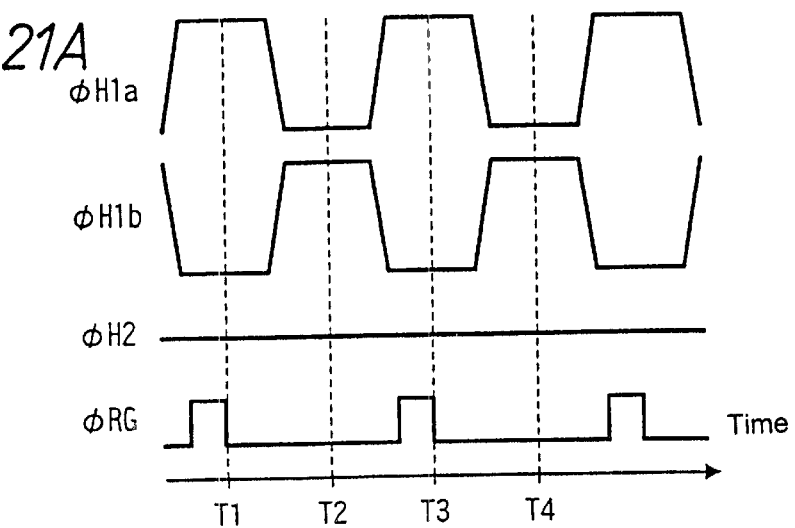
Figure 21B:
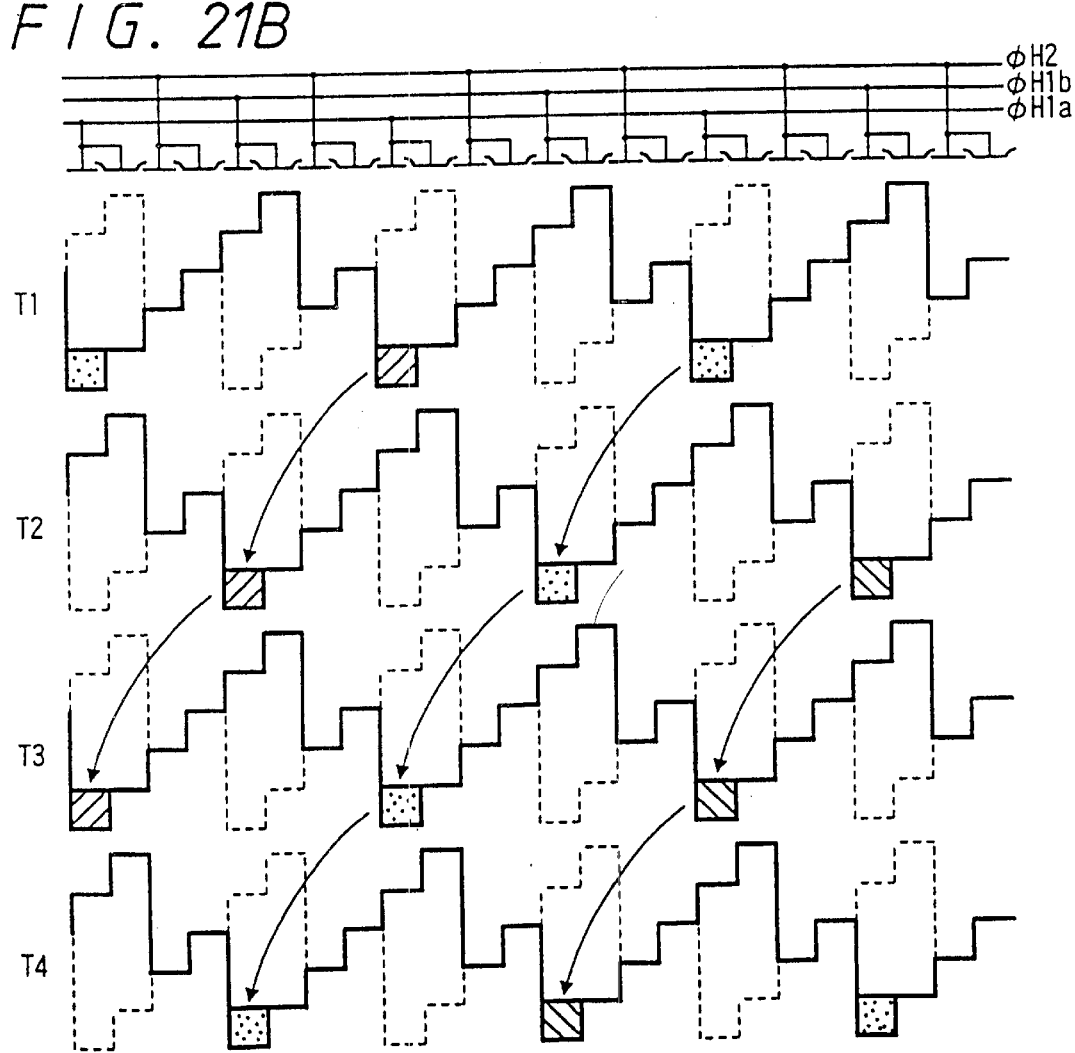

Next, the transfer operation at the time of the frame rate increase mode will be described with a timing chart shown in FIG. 21A and a potential diagram shown in FIG. 21B. When the frame rate increase mode is set by the mode setting portion 116, the timing generator 115 generates the horizontal transfer clocks φH1a, φH1b opposite in phase as shown in FIG. 21A and supplies the same to the horizontal transfer register 114. The horizontal transfer clock φH2 is fixed to a DC voltage Vfix of a predetermined voltage value like in the normal operation mode.

Because the horizontal transfer clock φH1a is at "H" level and the horizontal transfer clock φH1b is at "L" level when T=T1, the potential under the gate electrodes 134, 135 of φH1a is deep, the potential under the gate electrodes 134, 135 of φH1b is shallow and the potential under the gate electrodes 134, 135 of φH2 is at substantially a middle level therebetween. Further, because the potential under the gate electrode 134 is deeper than the potential under the gate electrode 135, the potential under the gate electrode 135 of φH1b is shallowest and the potential under the gate electrode 134 of φH1a is deepest, so that step-like distribution of the potential is attained.

Of the signal charge of one line amount transferred from the vertical transfer register 112 to the respective gate electrodes 134, 135 of φH1a, φH1b, the signal charge transferred to the portion under the gate electrodes 134, 135 of φH1b moves to the portion under the gate electrodes 134, 115 of φH1a through the gate electrodes 134, 135 of φH2, and accumulated under the gate electrode 134. As a result, during the transfer from the vertical transfer register 112 to the horizontal transfer register 114, the signal charge of two horizontal picture element amount is added.

Because the horizontal transfer clock φH1a is at "L" level and the horizontal transfer clock φH1b is at "H" level when T=T2, the potential under the gate electrodes 134, 135 of φH1a becomes shallow and the potential under the gate electrodes 134, 135 of φH1b becomes deep. Further because the potential under the gate electrode 134 is deeper than the potential under the gate electrode 135, the potential under the gate electrode 35 of φH1a is shallowest and the potential under the gate electrode 134 of φH1b is deepest, so that step-like distribution of the potential is attained. As a result, the signal charge of two horizontal picture element amount accumulated under the gate electrode 134 of φH1a moves to the portion under the gate electrodes 134, 135 of φH1b through the portion under the gate electrodes 134, 135 of φH2 and is accumulated under the gate electrode 134.

Because the horizontal transfer clock φH1a is at "H" level and the horizontal transfer clock φH1b is at "L" level again when T=T3, the potential under the gate electrodes 134, 135 of φH1a becomes deep and the potential under the gate electrodes 134, 135 of φH1b becomes shallow. Further, because the potential under the gate electrode 134 is deeper than the potential under the gate electrode 135, the potential under the gate electrode 134 of φH1a is deepest and the potential under the gate electrode 135 of φH1b is shallowest so that step-like distribution of the potential is attained. As a result, the signal charge of two horizontal picture element amount accumulated under the gate electrode 134 of φH1b moves to the portion under the gate electrodes 134, 135 of φH1a through the portion under the gate electrodes 134, 135 of φH1b and is accumulated under the gate electrode 134.

The same operation is repeated after T=T4. By this sequential transfer operation, the horizontal transfer of the signal charge of two horizontal picture element amount is carried out in one cycle of the horizontal transfer clocks φH1a, φH1b. Thus, if the frequency of the horizontal transfer clocks φH1a, φH1b or the horizontal drive frequency is the same as in the normal operation mode, the output period of one horizontal line becomes half.

Then, the signal charge of two horizontal picture element amount transferred transferred horizontally is supplied successively to the charge detecting portion 117 through the horizontal output gate portion 118 and converted to the signal voltage by the charge detecting portion 117 and then delivered as the CCD output through the output circuit 122. In the charge detecting portion 117, the reset gate pulse φRG is applied to the reset gate (RG) 121, so that the reset operation of the floating diffusion (FD) 119 is carried out at the period of the horizontal transfer clocks φH1a, φH1b.

As described above, in the horizontal transfer register 114 of the CCD area sensor of the inter-line transfer system, wiring is placed so as to drive the gate electrodes 134, 135 of φH1 adjacent to the gate electrodes 134, 135 of φH2 independently. The gate structure thereof is determined by repeating φH1a, φH2, φH1b, φH2. In the normal operation mode, φH2 is fixed to a DC value and the respective gate electrodes 34, 35 of φH1a, φH1b are driven by the same phase clock. In the frame rate increase mode, the φH2 is similarly fixed to a DC value. The respective gate electrodes 134, 135 of φH1a, φH1b are driven by the complementary 2-phase. Thus, the following operation and effect are obtained.

That is, in the frame rate increase mode, by fixing the φH2 to the DC value, subjecting the respective gate electrodes 134, 135 of φH1a, φH2 to the complementary 2-phase drive and then regarding φH1a, φH2, φH1b, φH2 as one cycle for the horizontal transfer, the transfer with addition of the signal charge of two horizontal picture element amount can be carried out. Thus, the output period of one horizontal line can be made half without changing the horizontal drive frequency so as to increase the frame rate. Conversely, if the frame rate is made to be constant, the horizontal drive frequency can be reduced, so that power consumption can be reduced.

If the φH1a according to the present invention is made to be of the same timing (same phase) with respect to the φH1 at the final step of a conventional horizontal transfer register, the same waveform as before can be obtained in terms of the CCD output waveform (same as before in terms of frequency and phase). Therefore, the same sampling as conventionally can be carried out without changing the CD pulse such as clamp pulse and the sample hold pulse in the signal processing system in the a following stage.

Here, the frame rate increase mode is set in a case of photometry or the like for exposure adjustment, for example, in a case when it is applied to a camera system. Therefore, by increasing the frame rate, the feedback for photometry or the like at the time of exposure adjustment is made rapid. Further, in the CCD area sensor of high picture element, by setting the frame rate increase mode, monitoring by a monitor of a television type such as the NTSC or the like is enabled.

Although the above embodiment is formed so that the DC value which is the horizontal transfer clock φH2 is given from outside of the CCD chip, it is permissible to so construct that the DC value is generated inside the CCD chip and this DC value is used in the horizontal transfer register 114 as the horizontal transfer clock φH2. According to this structure, the horizontal transfer clock terminal can perform its function with two pieces like conventionally. Thus, it is possible to realize the CCD area sensor having a change-over function between the normal operation mode and the frame rate increase mode without increasing the number of terminals.

Although the case in which the present invention is applied to the horizontal transfer register of the CCD area sensor of the inter-line transfer (IT) system has been described in the above embodiment, it can be applied also to the horizontal transfer register of a CCD area sensor of the frame transfer (FT) system or the frame inter-line transfer (FIT) system. Further, this can be applied to not only the area sensor but also the charge transfer portion of a linear sensor and the charge transfer portion of a CCD delay line as well as that of a solid-state imaging device.

By applying this invention to the charge transfer portion of the linear sensor and switching between the normal operation mode and the frame rate increase mode, the resolution can be changed over in one linear sensor. For example, change-over between a high resolution (2000 picture elements) mode and a low resolution/high speed (1000 picture elements) mode can be carried out by a linear sensor having 2000 picture elements. As for application, in a case in which it is permitted to reduce a resolution for pre-scan or the like in an image reading portion of a copier or the like, use of a high speed mode can be considered. On the other hand, when it is applied to the charge transfer portion of the CD delay line, the transfer efficiency can be improved by setting the frame rate increase mode.

In the above embodiments, the case of application to the monochrome CCD area sensor has been described. Because the signal charge of two horizontal picture elements is added to the horizontal transfer register 114, if this is applied to a single plate color CCD area sensor, color separation may not be realized. Then, various application examples in which the present invention is applied to the single plate CCD area sensor using, for example, 2×2 or 2×4 G checkered pattern arrangement original color filter so as to allow color separation will be described below.

Figure 22:
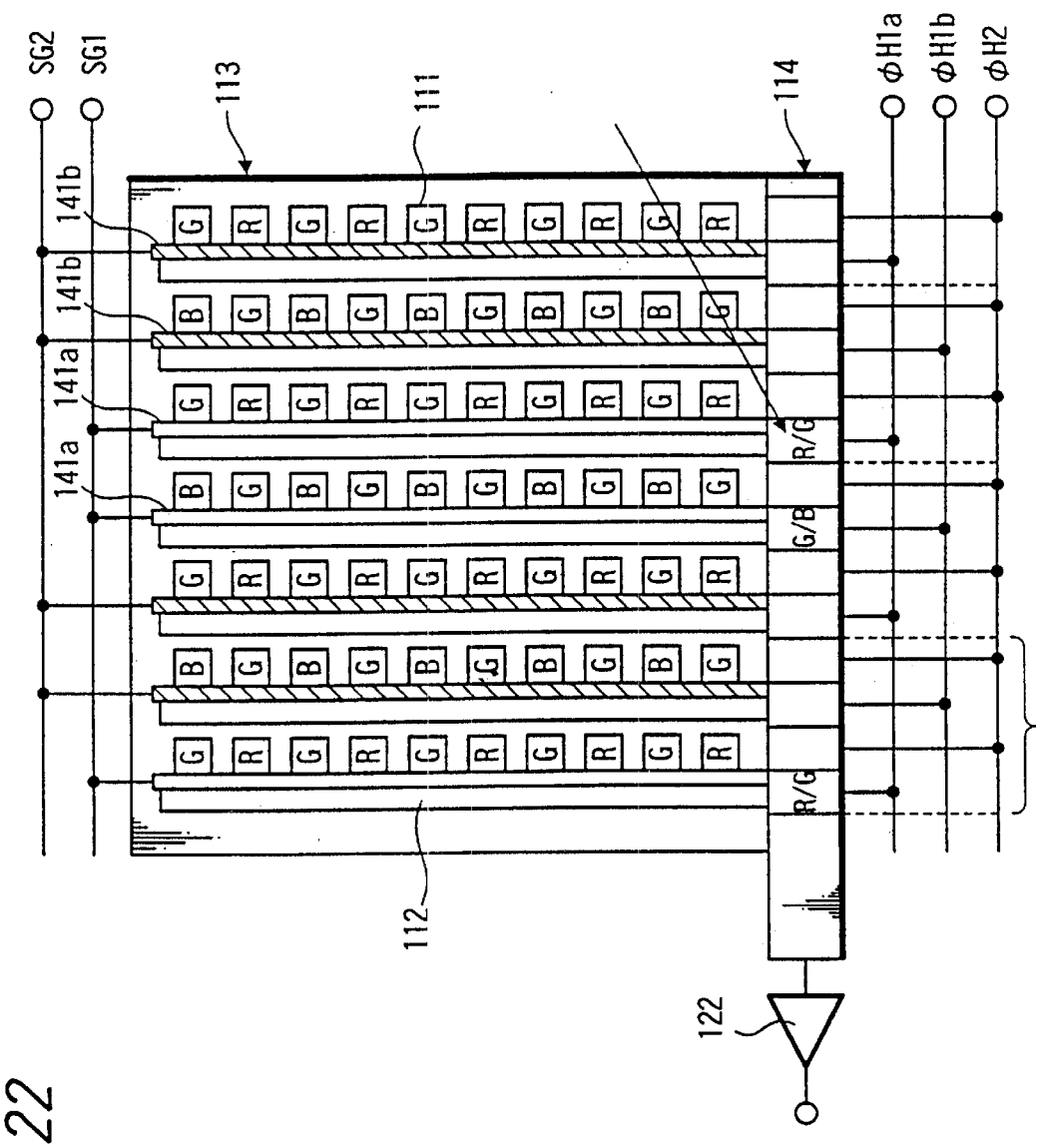
FIG. 22 is a schematic construction diagram showing a sixth embodiment of the present invention.

FIG. 22 is a schematic construction diagram showing a sixth embodiment of the present invention in which the same reference numerals are attached to the same components in FIG. 17. In this sixth embodiment, as a read out gate for reading a signal charge from the sensor 111 to the vertical transfer register 112, two systems of reading out gates 141a, 141b are provided such that, with respect to repetition of two picture elements of color filter in the horizontal direction, two column of the picture elements are arranged with one picture element transferred alternately at every two columns. The two systems of read out gates 41a, 41b can be driven by two kinds of read out gate pulses φSG1, φSG2 independently.

In this color CCD area sensor according to the sixth example, in the frame rate increase mode, by generating only the read out gate pulse φSG when reading the signal charge from the sensor portion 111, the reading is performed by only one read out gate 141a of two read out gates 141a, 141b provided here. As a result, even if the horizontal transfer register 114 is driven by the frame rate increase mode described in FIGS. 21A, 21B, only one color signal charge of two horizontal colors of the color filter is transferred from the vertical transfer register 112 to the horizontal transfer register 14 (VH transfer) in one cycle of the horizontal transfer register 114 (corresponding to two horizontal picture element amount during the normal operation). Thus, two horizontal picture elements φtwo colors) of the color filter can be separated.

On the other hand, in the normal operation mode, by generating two kinds of read out gate pulses φSG1, φSG2 at the same timing, two systems of read out gates 41a, 41b are driven in the same phase so as to read the signal charge from all the columns. Consequently, the signal charges of two horizontal colors of the color filter are transferred in the VH fashion. As described in FIGS. 20A, 20B, the signal charge is transferred horizontally one by one horizontal picture element each in one cycle of the horizontal transfer register 114.

Figure 23:
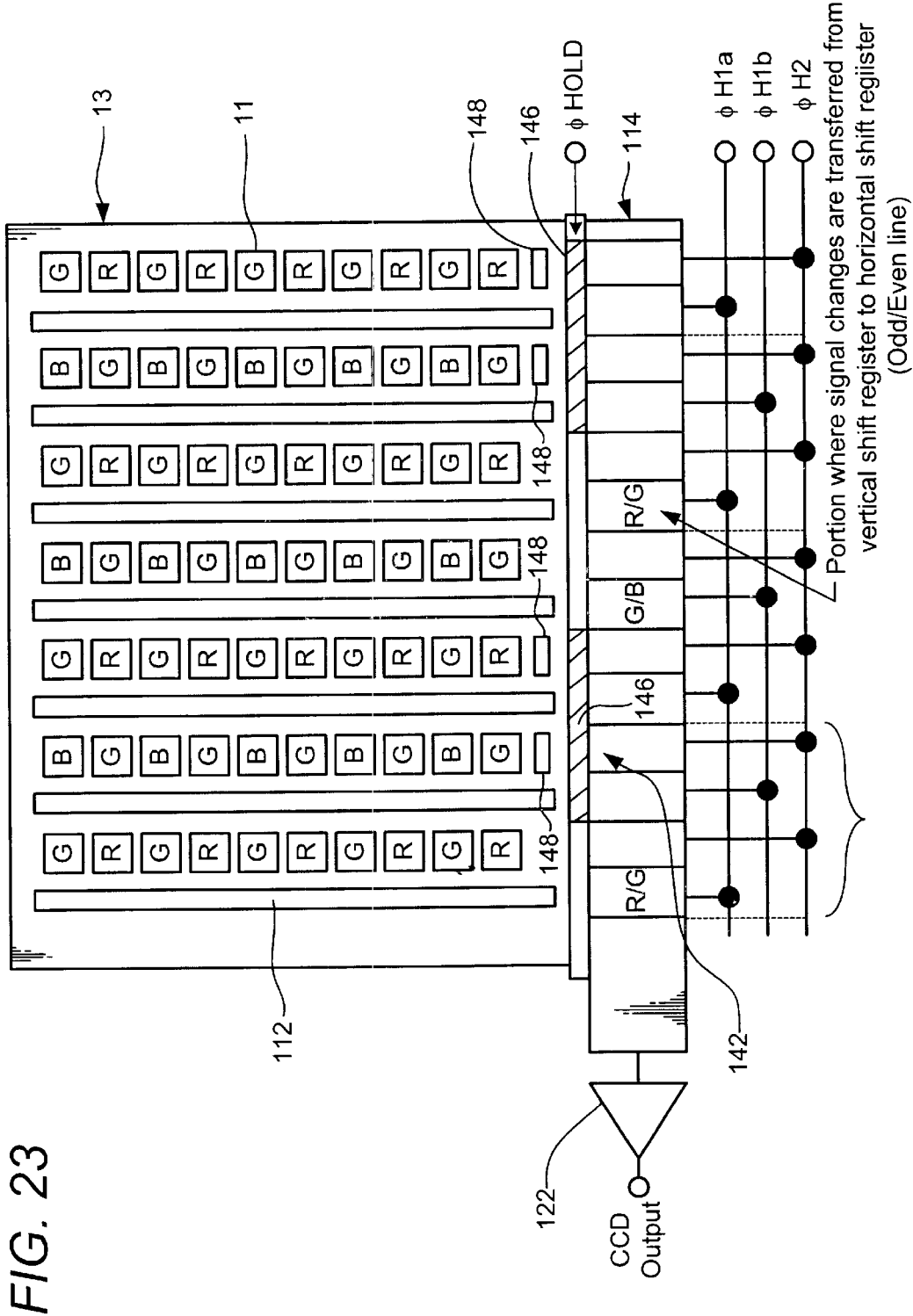
FIG. 23 is a schematic construction diagram showing a seventh embodiment of the present invention.

FIG. 23 is a schematic construction diagram showing a seventh embodiment of the present invention. The same reference numerals are attached to the same components as in FIG. 17. According to the seventh embodiment, in a transfer path from the vertical transfer register 112 to the horizontal transfer register 114, there is provided a control gate portion 142, which selectively prevents the VH transfer for repetition of two picture of the color filter in the horizontal direction with one picture element transferred and which transfer signal charges of only remaining picture elements to the horizontal transfer register 114.

Figure 24:
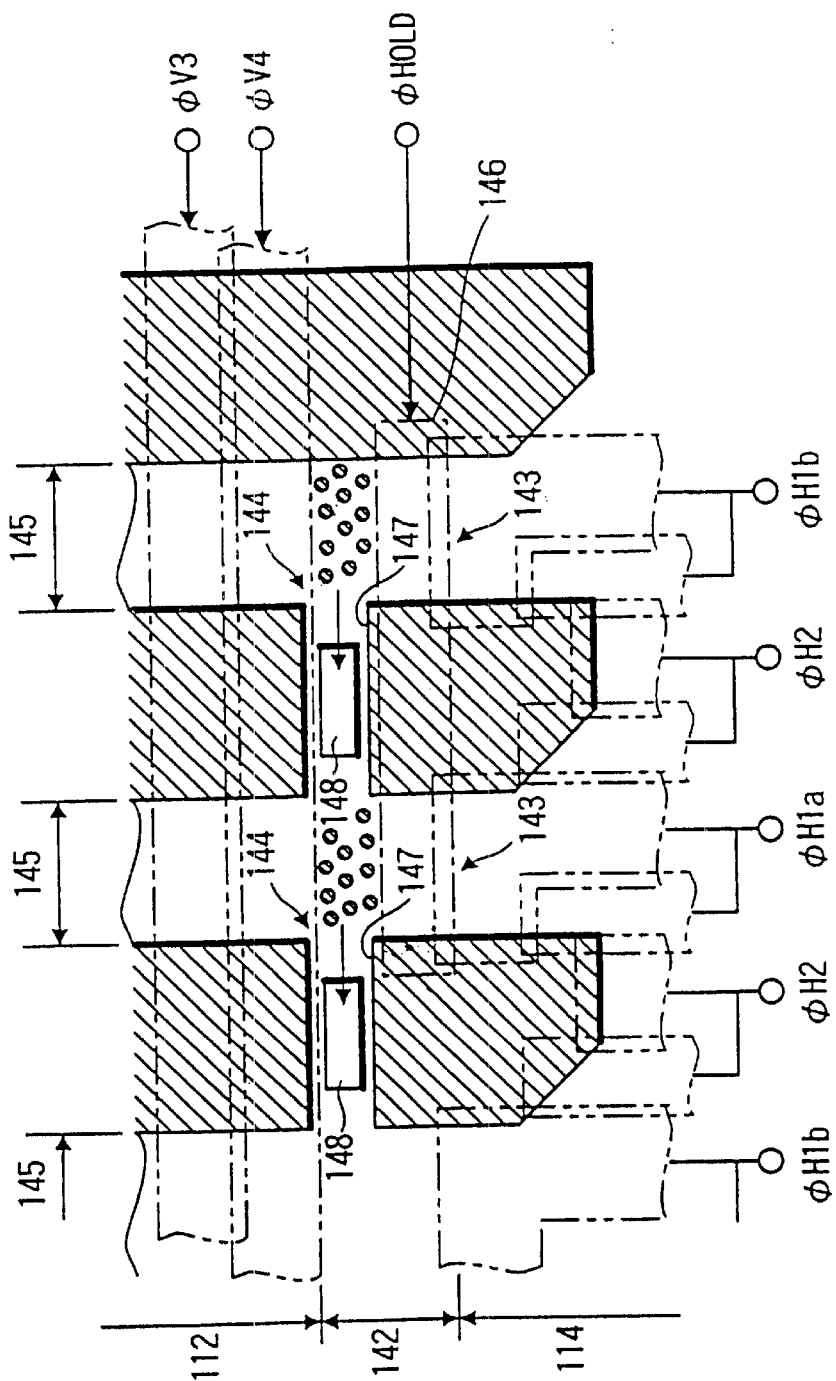
FIG. 24 is a plan pattern diagram showing a part of a construction of a control gate portion relating to the seventh embodiment.

FIG. 24 shows an example of a structure of the control gate portion 142. Referring to FIG. 24, the control gate portion 142 comprises a transfer blocking portion 143 for blocking the VH transfer of the signal charge of every two picture elements in the horizontal direction by being supplied with a "L" level hold pulse φHOLD and a charge discharging portion 144 for discharging the transfer-blocked signal charge. The transfer blocking portion 143 has a hold gate electrode 146 disposed above a transfer channel 145 of the vertical transfer register 112 for two column amounts and a hold pulse φHOLD is applied to this hold gate electrode 146.

On the other hand, the charge discharging portion 144 comprises a guide channel 147 which connects the respective transfer channels 145, 145 of the adjacent vertical transfer registers 112 so as to guide the signal charge blocked by the transfer blocking portion 143 and a drain 148 for discharging the signal charge flowing from the transfer channel 145 of the vertical transfer register 112 through the guide channel 147 to a substrate. Meantime, the structure of the above described transfer blocking portion 143 and charge discharging portion 144 is only an example, and is not limited to this example.

In the color CCD area sensor according to the seventh embodiment, in the frame rate increase mode, by applying the "L" level hold pulse φHOLD to the hold gate electrode 146 during the VH transfer, the potential under the hold gate electrode 146 becomes shallow in the transfer channel 145 because of repetition of two picture elements in the horizontal direction of the color filter with one picture element amount transferred specially, so that the VH transfer is blocked by the repetition of two picture elements in the horizontal direction.

The signal charge blocked by the transfer blocking portion 143 is swept out to the drain 148 through the guide channel 147. Therefore, even if the horizontal transfer register 114 is driven in the frame rate increase mode described in FIGS. 21A, 21B, the signal charge of only one of two horizontal colors of the color filter is transferred in the VH fashion in one cycle (corresponding to two horizontal picture elements during the normal operation) of the horizontal transfer register 114, so that two horizontal picture elements (two colors) of the color filter can be separated.

On the other hand, because in the normal operation mode, the hold pulse φHOLD becomes to "H" level, the potential under the hold gate electrode 146 in the transfer channel 145 becomes deep. Consequently, transfer blocking is not carried out in the transfer blocking portion 143 and the VH transfer is carried out in all the columns. Thus, although the signal charges of the two horizontal colors of the color filter are transferred in the VH fashion., as described in FIGS. 20A, 20B, the signal charge is transferred horizontally one by one in one cycle of the horizontal transfer register 114.

Figure 25:
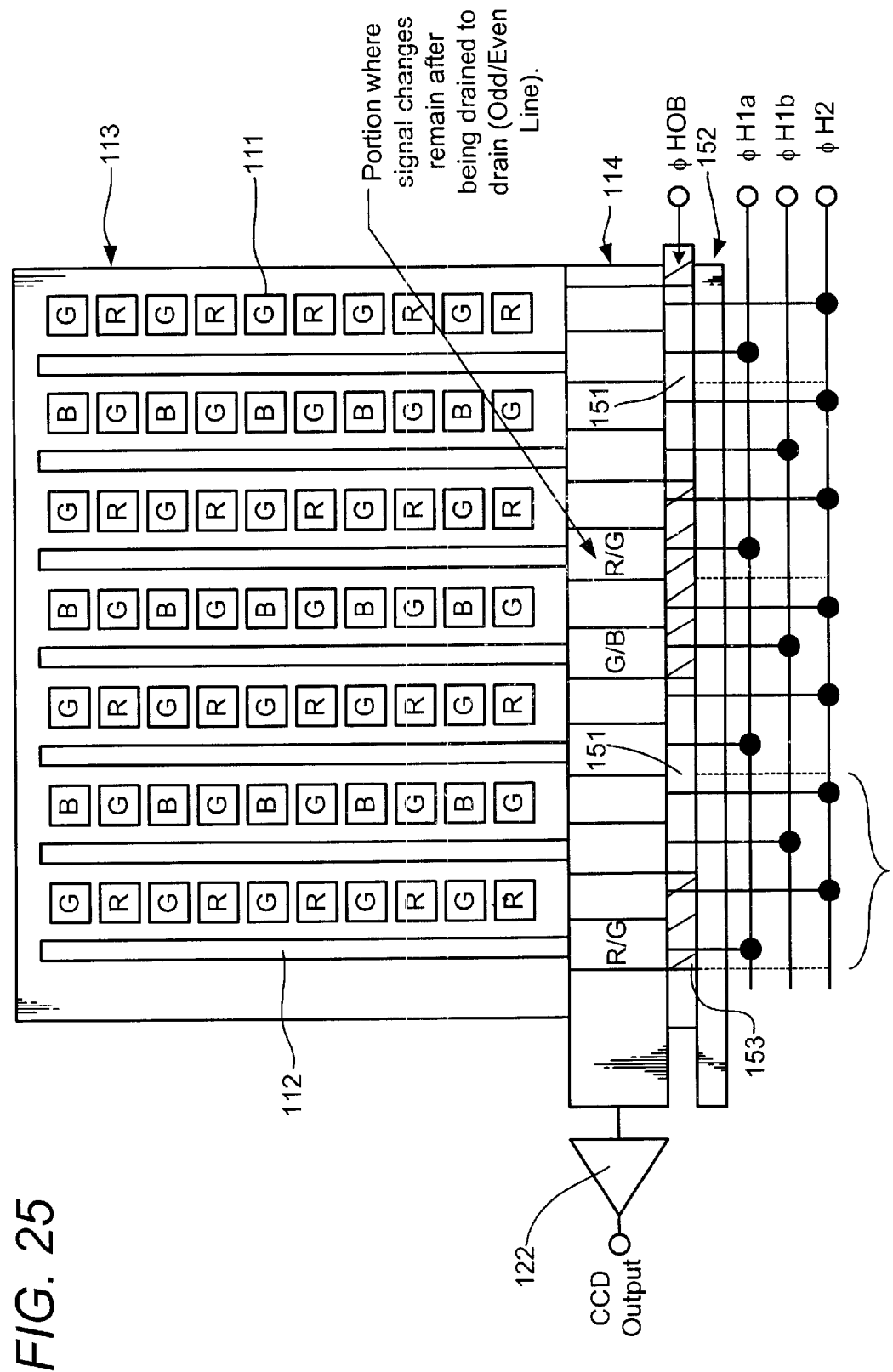
FIG. 25 is a schematic construction diagram showing an eighth embodiment of the present invention.

FIG. 25 is a schematic construction diagram showing an eighth embodiment of the present invention. In this figure, the same reference numerals are attached to the same components as in FIG. 17. According to the eighth embodiment, a sweeping gate 51 is provided adjacent to the horizontal transfer register 114 on an opposite side to the imaging area 113 of the horizontal transfer register 114 and a drain 152 is provided outside of the sweeping gate 151. The sweeping gate 151 is formed in such a manner that two picture elements are repeated with one picture element transferred with respect to each of the transfer stages corresponding to the picture elements of the horizontal transfer register 114.

A sweeping gate pulse φHOB is selectively applied to the sweeping gate 151. The sweeping gate 151 sweeps the signal charge corresponding to a transfer stage in the horizontal transfer register 114 by being supplied with sweeping gate pulse φHOB into the drain 152. Meantime, a region (hatched portion) 153 corresponding to two picture elements between the sweeping gates 151 is channel stop region.

In the color CCD area sensor according to the eighth embodiment of the present invention, in the frame rate increase mode, when the "H" level sweeping gate pulse φHOB is applied to the sweeping gate 115 during the VH transfer, the potential under the sweeping gate 151 becomes deep. Thus, the signal charge VH-transferred from the respective vertical transfer register 112 to the horizontal transfer register 114 is swept out to the drain 152 through the sweeping gate 151 such that two picture elements are repeated with one picture element transferred.

As a result, separation of the horizontal two picture elements (two colors) in the color filter can be carried out.

Although in the previously described embodiment, the signal charge of two horizontal picture element amount is added at the transfer stage from the vertical transfer register 112 to the horizontal transfer register 114, according to the eighth embodiment, when the transfer is carried out from the vertical transfer register 112 to the horizontal transfer register 114, the signal charges VH-transferred to the transfer stage of the gate electrodes 134, 135 of φH1a and the transfer stage of the gate electrodes 134, 135 of φH1b must be separated. To this end, at the time of the VH transfer, both the horizontal transfer clocks φH1a, φH1b must be made at "H" level. Then, when the horizontal transfer operation starts, the horizontal transfer clocks φH1a, φH1b are reversed in phase.

On the other hand, when the sweeping gate pulses φH1a, φHOB to be applied to the sweeping gate 151 are made to "L" level in the norma operation mode, the potential under the sweeping gate 151 becomes shallow. Thus, sweeping of the signal charge from the sweeping gate 151 to the drain 152 is not carried out and the signal charges are accumulated in all the transfer stages of the horizontal transfer register 114. Then, as described in FIGS. 22A, 22B, the signal charges are transferred horizontally successively in order of each horizontal picture element in one cycle of the horizontal transfer register 114.

As shown in the sixth–eighth embodiments, by thinning the signal charge in the horizontal direction by repetition of two picture elements in the horizontal direction with one picture transferred, for the repetition of two horizontal picture elements of the color filter color separation can be carried out securely even when the present invention is applied to a single plate color CCD area sensor. Although in the sixth–eighth embodiments, a case in which the present invention is applied to the 2×2 or 2×4 G checkered arrangement original color filter has been described, the color arrangement is not restricted to this example. Further, the present invention is applicable to a complementary color filter.

Although the sixth–eighth embodiments have been made for color separation in the single plate color CCD area sensor, the thinning operation for the signal charges in the horizontal direction can be applied to a monochrome CCD area sensor thereby improving its frame rate. Further, by combining this thinning operation for the signal charges in the horizontal direction, with a conventional thinning operation by sweeping the signal charges in the vertical direction to the drain adjacent to the horizontal transfer register 114, the frame rate can be further improved.

In a case of a CCD area sensor having 1280 (H)×980 (V), picture elements that is, 1,200,000 picture elements, by carrying out the thinning operation for the signal charges in the horizontal direction described in the seventh (FIG. 23) and eighth (FIG. 25) embodiments, and, as for the vertical direction, carrying out the thinning operation by reading two lines each through two systems of read out gates, it is possible to output to a VGA (video graphics array) or a NTSC/PAL monitor without deviating the optical center from the normal operation mode.

According to the present invention, there is provided a charge transfer portion comprising first phase and second phase electrode pairs arranged alternately in the transfer direction above the transfer channel and having such an electrode structure that the first phase electrode pair is wired so as to be driven independently across the second phase electrode pair. While a DC voltage is supplied to the second phase electrode pair, transfer clocks of opposite phase are supplied to each of the first phase electrode pair sandwiching the second phase electrode pair so as to achieve the complementary 2-phase drive. Thus, the transfer operation is carried out with one of the first phase electrode pair, the second phase electrode pair, the other of the first electrode pair, and second phase electrode pair as one single cycle. Thus, the signal charge of two picture element amount in the transfer direction can be added together and transferred. Therefore, the output period of a horizontal line can be reduced to half without changing the horizontal drive frequency, thereby increasing the frame rate.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A charge transfer device, comprising:
an electrode structure formed of electrode pairs for first and second phases repeatedly and alternately arranged above a transfer channel in its transfer direction and wired such that said electrode pairs for the first phase located across said electrode pairs for the second phase can be independently driven;
means for applying a DC voltage to said electrode pairs for the second phase; and
means for supplying transfer clocks having a phase reverse each other to each of said electrode pairs for the first phase located across each of said electrode pairs for the second phase.

2. A solid-state imaging device comprising:
an imaging unit formed of a plurality of pixels for converting an incident light into a signal charge; and
a charge transfer portion for transferring signal charges read out from said plurality of pixels, wherein said charge transfer portion has an electrode structure formed of electrode pairs for first and second phases repeatedly and alternately arranged above a transfer channel in its transfer direction and wired such that said electrode pairs for the first phase located across said electrode pairs for the second phase can be independently driven, a mode setting unit for setting an operation mode, and means for, when said mode setting unit sets a first operation mode, supplying a DC voltage or a transfer clock having a phase reverse to that of the transfer clock for the first phase to the electrode pair for the second phase and supplying a transfer clock having the same phase as that of the transfer clock to each of said electrode pairs located across said electrode pair for the second phase and for, when said mode setting unit sets a second operation mode, applying a DC voltage to said electrode pair for the second phase and supplying transfer clocks having reverse phase to each of said electrode pairs for the first phase located across said electrode pair for the second phase.

3. A solid-state imaging device according to claim 2, wherein said charge transfer portion carries out a transfer operation in said first operation mode with employing an mount of one pixel as one cycle and carries out a transfer operation in said second operation mode with employing an amount of two pixels as one cycle.

4. A solid-state imaging device according to claim 3, wherein in said second operation mode a phase of a transfer clock at a final stage is the same as a phase of the transfer clock at the final stage in said first operation mode.

5. A solid-state imaging device according to claim 2, wherein in said second operation mode a signal charge is selectively transferred at every predetermined repeated pixel of said plurality of pixels in the transfer direction.

6. A solid-state imaging device according to claim 5, wherein said imaging unit comprises a plurality of pixels arranged in a matrix fashion, a plurality of vertical transfer portions each of which is provided at every vertical column of said plurality of pixels, and a read out gate portion for, in said first operation mode, reading signal charges out from all of said plurality of pixels to said vertical transfer portions and for, in said second operation mode, selectively reading signal charges out from respective predetermined repeated pixels of said plurality of pixels in the transfer direction to said vertical transfer portions.

7. A solid-state imaging device according to claim 5, wherein said imaging unit comprises a plurality of pixels arranged in a matrix fashion, a plurality of vertical transfer portions each of which is provided at every vertical column of said plurality of pixels and which vertically transfers a signal charge read out from each of said plurality of pixels, and a control gate portion for selectively transferring a signal charge of each of predetermined repeated pixels in the horizontal direction of said plurality of pixels to said charge transfer portion from said plurality of vertical transfer portions.

8. A solid-state imaging device according to claim 5, wherein said charge transfer portion comprises a charge draining portion for draining a signal charge other than signal charges of the predetermined repeated pixels in the transfer direction of signal charges of said plurality of pixels transferred from said imaging unit.

9. A method of driving a solid-state imaging device which has an imaging unit formed of a plurality of pixels for converting an incident light into a signal charge, and a charge transfer portion for transferring signal charges read out from said plurality of pixels and in which said charge transfer portion has an electrode structure formed of electrode pairs for first and second phases repeatedly and alternately arranged above a transfer channel in its transfer direction and wired such that said electrode pairs for the first phase located across said electrode pairs for the second phase can be independently driven, comprising the steps of:

in a first operation mode, supplying a DC voltage or a transfer clock having a phase reverse to that of a transfer clock for the electrode pairs for the first phase to the electrode pairs for the second phase and supplying a transfer clock having the same phase to each of said electrode pairs for the first phase located across said electrode pair for the second phase; and a second operation mode, applying a DC voltage to said electrode pairs for the second phase and supplying transfer clocks having reverse phase to each of said electrode pairs for the first phase located across said electrode pair for the second phase.

10. A driving method according to claim 9, wherein said charge transfer portion carries out a transfer operation in said first operation mode with employing an mount of one pixel as one cycle and carries out a transfer operation in said second operation mode with employing an amount of two pixels as one cycle.

11. A driving method according to claim 9, wherein in said second operation mode a phase of a transfer clock at a final stage is the same as a phase of the transfer clock at the final stage in said first operation mode.

12. A driving method according to claim 9, wherein in said second operation mode a signal charge is selectively transferred at every predetermined repeated pixel of said plurality of pixels in the transfer direction.

13. A driving method according to claim 12, wherein said imaging unit comprises a plurality of pixels arranged in a matrix fashion, a plurality of vertical transfer portions located at each of vertical columns of said plurality of pixels and read out gate portions provided between each of vertical columns of said plurality of pixels and each of corresponding vertical transfer portions, and wherein in said first operation mode, signal charges are read out from all of said plurality of pixels to said vertical transfer portions by using said read out gate, and in said second operation mode, signal charges are selectively read out from respective predetermined repeated pixels of said plurality of pixels in the transfer direction to said vertical transfer portions by using said read out gate.

14. A driving method according to claim 12, wherein said imaging unit comprises a plurality of pixels arranged in a matrix fashion, a plurality of vertical transfer portions each of which is provided at each of a vertical columns of said plurality of pixels and which vertically transfers a signal charge read out from each of said plurality of pixels, and a control gate portion located between said imaging unit and said charge transfer portion, wherein said control gate portion selectively transfers a signal charge of each of predetermined repeated pixels in the horizontal direction of said plurality of pixels to said charge transfer portion from said plurality of vertical transfer portions.

15. A driving method according to claim 12, wherein said charge transfer portion comprises a charge draining portion for draining a signal charge which drains signal charges other than signal charges of the predetermined repeated pixels in the transfer direction of signal charges of said plurality of pixels transferred from said imaging device.

* * * * *